US012059102B2

(12) United States Patent
Gospel et al.

(10) Patent No.: US 12,059,102 B2
(45) Date of Patent: Aug. 13, 2024

(54) PIVOTABLE DUAL SHOWERHEAD WITH MULTIPLE SPRAY MODES

(71) Applicant: Delta Faucet Company, Indianapolis, IN (US)

(72) Inventors: Thomas Edward Gospel, Carmel, IN (US); Michael Scot Rosko, Greenwood, IN (US); Bocomo Fu, Guangzhou (CN); Ling Xing-Chuan, Xiamen (CN); Alex Wu, Taichung (TW)

(73) Assignee: Delta Faucet Company, Indianapolis, IN (US)

( * ) Notice: Subject to any disclaimer, the term of this patent is extended or adjusted under 35 U.S.C. 154(b) by 306 days.

(21) Appl. No.: 17/536,382

(22) Filed: Nov. 29, 2021

(65) Prior Publication Data

US 2022/0167801 A1 Jun. 2, 2022

Related U.S. Application Data

(60) Provisional application No. 63/119,111, filed on Nov. 30, 2020.

(51) Int. Cl.
*A47K 3/28* (2006.01)
*B05B 1/18* (2006.01)

(52) U.S. Cl.
CPC .............. *A47K 3/283* (2013.01); *B05B 1/185* (2013.01); *A47K 3/281* (2013.01)

(58) Field of Classification Search
CPC .... A47K 3/283; B05B 1/1645; B05B 15/652; B05B 15/654; B05B 1/185
See application file for complete search history.

(56) References Cited

U.S. PATENT DOCUMENTS 3,402,893 A * 9/1968 Hindman .............. B05B 15/654 239/602
4,398,669 A 8/1983 Fienhold
(Continued)

FOREIGN PATENT DOCUMENTS

AU 2017100689 A4 7/2017
CN 101757994 6/2010
(Continued)

OTHER PUBLICATIONS

HydroRain® H2Okinetic® Two-in-One Shower Head, an affordable way to spa every day, retrieved on May 7, 2020 at https://www.deltafaucet.com/design-innovation/innovations/shower/hydrorain-two-in-one-shower-head, 10 pages.
(Continued)

*Primary Examiner* — J C Jacyna
(74) *Attorney, Agent, or Firm* — Bose McKinney & Evans LLP

(57) ABSTRACT

A showerhead includes an inlet configured to receive water from the supply conduit. An inner spray portion is coupled to the inlet. A first spray outlet is coupled to the inner spray portion, and the first spray outlet selectively receives water from the inlet and discharges water from the showerhead in a first discharge direction. An outer spray portion is pivotally coupled to the inner spray portion. A second spray outlet is coupled to the outer spray portion, and the second spray outlet selectively receives water from the inlet and discharges water from the showerhead in a second discharge direction. A third spray outlet is coupled to the outer spray portion, and the third spray outlet selectively receives water from the inlet and discharges water from the showerhead in a third discharge direction. The third discharge direction is substantially opposite the second discharge direction.

23 Claims, 23 Drawing Sheets

(56) References Cited

U.S. PATENT DOCUMENTS

| | | | | |
|---|---|---|---|---|
| 4,975,993 | A | 12/1990 | Black et al. | |
| 5,961,046 | A | 10/1999 | Joubran | |
| 6,442,775 | B1 | 9/2002 | Gransow et al. | |
| 6,896,201 | B1 | 5/2005 | Ouyoung | |
| D533,251 | S | 12/2006 | Sadler | |
| 7,194,775 | B2 | 3/2007 | Leung | |
| D622,812 | S | 8/2010 | Yongyan | |
| 7,900,295 | B2 | 3/2011 | Lev | |
| 8,733,675 | B2 | 5/2014 | Leber | |
| 9,132,437 | B2 | 9/2015 | Zhou et al. | |
| 9,149,817 | B2 | 10/2015 | Lev | |
| 9,308,540 | B2 | 4/2016 | Alcamo | |
| 9,828,752 | B2 | 11/2017 | Genord et al. | |
| 9,925,545 | B2 | 3/2018 | Parisi-Amon et al. | |
| 10,159,993 | B1 | 12/2018 | Lin | |
| 10,272,451 | B2 | 4/2019 | Ukigai et al. | |
| 10,369,578 | B2 | 8/2019 | Allard | |
| 10,376,905 | B2 | 8/2019 | Yang | |
| 10,399,094 | B2 | 9/2019 | Huffington et al. | |
| 11,179,735 | B2 * | 11/2021 | Wu | B05B 1/207 |
| 2008/0073449 | A1 * | 3/2008 | Haynes | B05B 15/652<br>239/566 |
| 2011/0133003 | A1 * | 6/2011 | Lu | B05B 1/169<br>239/587.5 |
| 2013/0200176 | A1 * | 8/2013 | Alcamo | B05B 3/08<br>239/245 |
| 2013/0299608 | A1 | 11/2013 | Spangler et al. | |
| 2014/0008467 | A1 * | 1/2014 | Allard | B05B 1/207<br>239/548 |
| 2016/0339457 | A1 | 11/2016 | Hou | |
| 2018/0238032 | A1 | 8/2018 | Russell et al. | |
| 2019/0366357 | A1 * | 12/2019 | Ning | B05B 1/12 |
| 2020/0086336 | A1 | 3/2020 | Rosko et al. | |
| 2020/0206757 | A1 | 7/2020 | Wu et al. | |
| 2021/0178409 | A1 * | 6/2021 | Hofman | E03C 1/0408 |

FOREIGN PATENT DOCUMENTS

| | | | | |
|---|---|---|---|---|
| CN | 101786055 | | 7/2010 | |
| CN | 101790423 | A | 7/2010 | |
| CN | 201572693 | U | 9/2010 | |
| CN | 101879483 | | 11/2010 | |
| CN | 102500477 | | 6/2012 | |
| CN | 103962253 | | 8/2014 | |
| CN | 203990978 | | 12/2014 | |
| CN | 204220368 | | 3/2015 | |
| CN | 205517791 | | 8/2016 | |
| CN | 205887496 | U | 1/2017 | |
| CN | 207056834 | U | 3/2018 | |
| CN | 207153984 | U | 3/2018 | |
| CN | 107952598 | A | 4/2018 | |
| CN | 109174479 | A | 1/2019 | |
| CN | 109382225 | A | 2/2019 | |
| CN | 109433437 | A | 3/2019 | |
| CN | 110623574 | A | 12/2019 | |
| CN | 112604830 | A | 4/2021 | |
| DE | 112010004689 | | 4/2020 | |
| FR | 3112701 | A1 * | 1/2022 | B05B 1/185 |
| JP | 2007117985 | A | 5/2007 | |
| TR | 201706422 | * | 9/2017 | B05B 1/1645 |
| WO | WO2011063699 | | 6/2011 | |
| WO | WO2011063726 | | 6/2011 | |
| WO | WO2011069454 | | 6/2011 | |
| WO | WO2011091737 | | 8/2011 | |
| WO | WO2019126987 | | 7/2019 | |
| WO | WO2020201692 | | 10/2020 | |

OTHER PUBLICATIONS

Delta In2ition, Combination Shower Head and Hand Shower In2ition® Two-in-One Shower, retrieved on May 7, 2020 at https://www.deltafaucet.com/design-innovation/innovations/shower/in2ition-two-in-one-shower#Products, 14 pages.

Kohler Converge, K-R77634 Converge 5-Spray, retrieved on May 7, 2020 at https://www.us.kohler.com/us/converge-5-spray-showering-combo/productDetail/handshowers/1295147.htm, 3 pages.

Grohe Freehander, Freehander Shower System with Concealed Fitting, retrieved on May 7, 2020 at https://www.grohe.us/en_us/freehander-shower-system-with-concealed-fitting-27007000.html, 9 pages.

Moen Halo, Halo Chrome three-function 9 diameter spray head rainshower, retrieved on May 7, 2020 at https://www.moen.com/products/Halo/Halo_Chrome_threefunction_9_diameter_spray_head_rainshower/26017, 7 pages.

Sharper Image, Pivoting High Pressure Showerhead @ Sharper Image2, retrieved on May 7, 2020 at https://www.sharperimage.com/si/view/product/Pivoting+High+Pressure+Showerhead/202207?p=plist2470005&utm_source=Google&utm_medium=CPC&utm_campaign=Shopping+PLAs+-+Medium&Keyword=&device=c&creative=379960855349&cm_mmc=CPC-_-Google-_-Shopping+PLAs+-+Medium-_-379960855349&network=g&matchtype=&adpos=&creative=379960855349&mkwid=IJdmZi7Npkwpcrid379960855349pmtpdvcslidproductid202207-01&gclid=CjwKCAjw4871BRAjEiwAbxXi29R1SKZP1Mp05Yz73nPp3og4-KJ4oqnBgqcrv2j2xcbi2GY7E-Zy-hoCVggQAvD_BwE, 4 pages.

* cited by examiner

PIVOTABLE DUAL SHOWERHEAD WITH MULTIPLE SPRAY MODES

CROSS-REFERENCE TO RELATED APPLICATION

The present application claims priority to U.S. Provisional Patent Application Ser. No. 63/119,111, filed Nov. 30, 2020, the disclosure of which is expressly incorporation herein by reference.

BACKGROUND AND SUMMARY OF THE DISCLOSURE

The present invention relates generally to showerheads. More particularly, the present invention relates to a reconfigurable showerhead having multiple spray modes.

Adjustable showerheads are known in the art for providing pressurized water flow to a user. However, conventional showerheads may not provide the user with an effective spray pattern and aesthetically pleasing design. Furthermore, such showerheads may require a considerable amount of repositioning for the user, or may not provide sufficient spray coverage given water flow or pressure limits.

In one illustrative embodiment of the present disclosure, a showerhead is configured to couple to a supply conduit and receive water therefrom. The showerhead includes an inlet configured to receive water from the supply conduit. An inner spray portion is coupled to the inlet. A first spray outlet is coupled to the inner spray portion, and the first spray outlet selectively receives water from the inlet and discharges water from the showerhead in a first discharge direction. An outer spray portion is pivotably coupled to the inner spray portion. A second spray outlet is coupled to the outer spray portion, and the second spray outlet selectively receives water from the inlet and discharges water from the showerhead in a second discharge direction. A third spray outlet is coupled to the outer spray portion, and the third spray outlet selectively receives water from the inlet and discharges water from the showerhead in a third discharge direction. The third discharge direction is substantially opposite the second discharge direction.

In another illustrative embodiment of the present disclosure, a showerhead is configured to couple to a supply conduit and receive water therefrom. The showerhead includes an inlet configured to receive water from the supply conduit. A first spray portion is coupled to the inlet. A second spray portion is pivotably carried by the first spray portion. The second spray portion is pivotable relative to the first spray portion from a first spray configuration to a second spray configuration and vice versa, and from the second spray configuration to a third spray configuration and vice versa. A first spray outlet is coupled to the first spray portion. The first spray outlet receives water from the inlet and discharges water from the showerhead in the first spray configuration and the second spray configuration, and the first spray outlet does not receive water from the inlet in the third spray configuration. A second spray outlet is coupled to the second spray portion. The second spray outlet receives water from the inlet and discharges water from the showerhead in the first spray configuration, and the second spray outlet does not receive water from the inlet in the second spray configuration and the third spray configuration. A third spray outlet is coupled to the second spray portion. The third spray outlet does not receive water from the inlet in the first spray configuration, and the third spray outlet receives water from the inlet and discharges water from the showerhead in the second spray configuration and the third spray configuration.

Additional features and advantages of the present invention will become apparent to those skilled in the art upon consideration of the following detailed descriptions of the illustrative embodiment best exemplifying the best mode of carrying out the invention as presently perceived.

BRIEF DESCRIPTION OF THE DRAWINGS

A detailed description of the drawings particularly refers to the accompanying figures in which.

DETAILED DESCRIPTION OF THE DRAWINGS

The embodiments of the invention described herein are not intended to be exhaustive or to limit the invention to the precise forms disclosed. Rather, the embodiments selected for description have been chosen to enable one skilled in the art to practice the invention.

Figure 1:
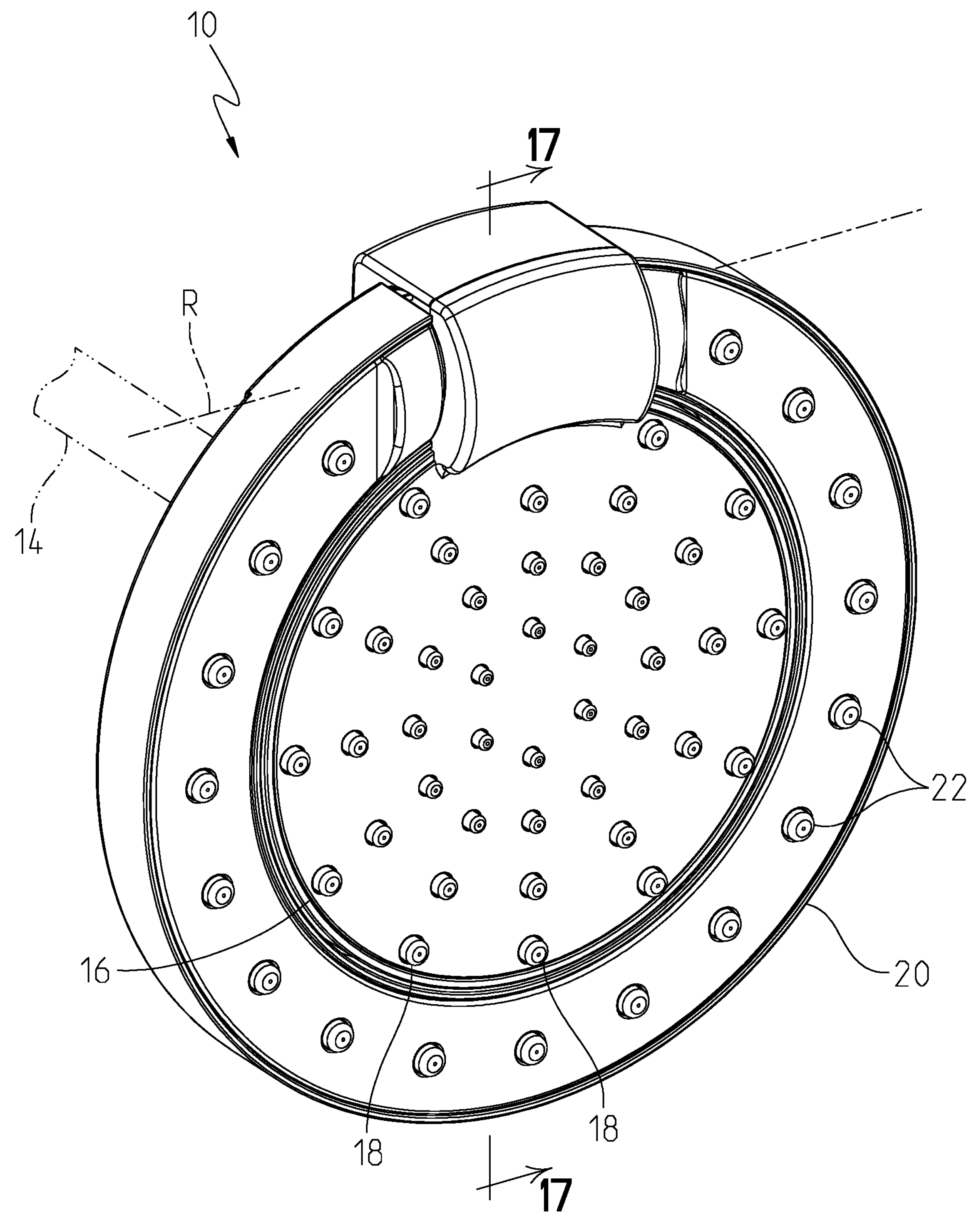
FIG. 1 is a front perspective view of an illustrative showerhead of the present disclosure in a first spray configuration.
Figure 2:
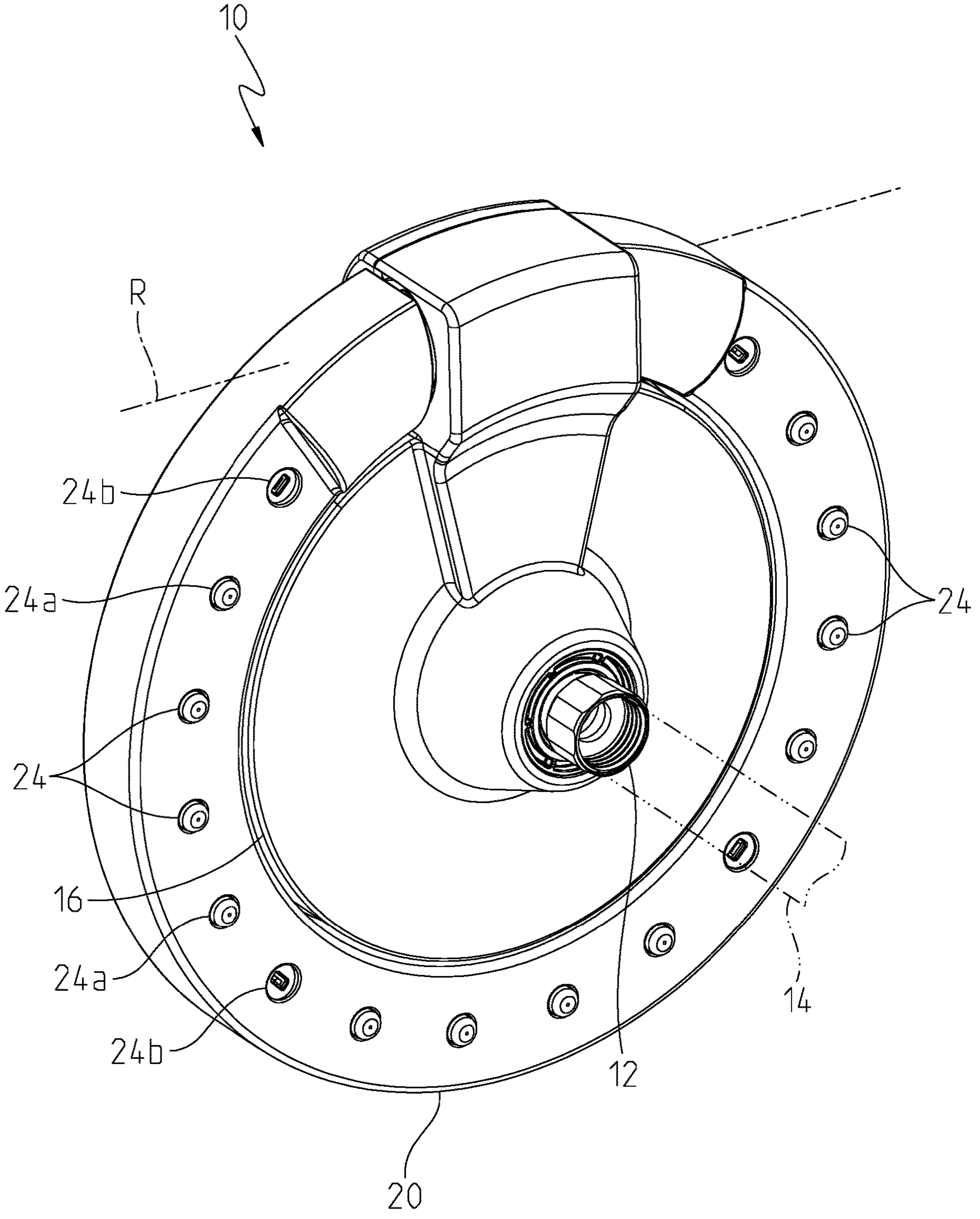
FIG. 2 is a rear perspective view of the showerhead of FIG. 1 in the first spray configuration.
Figure 3:
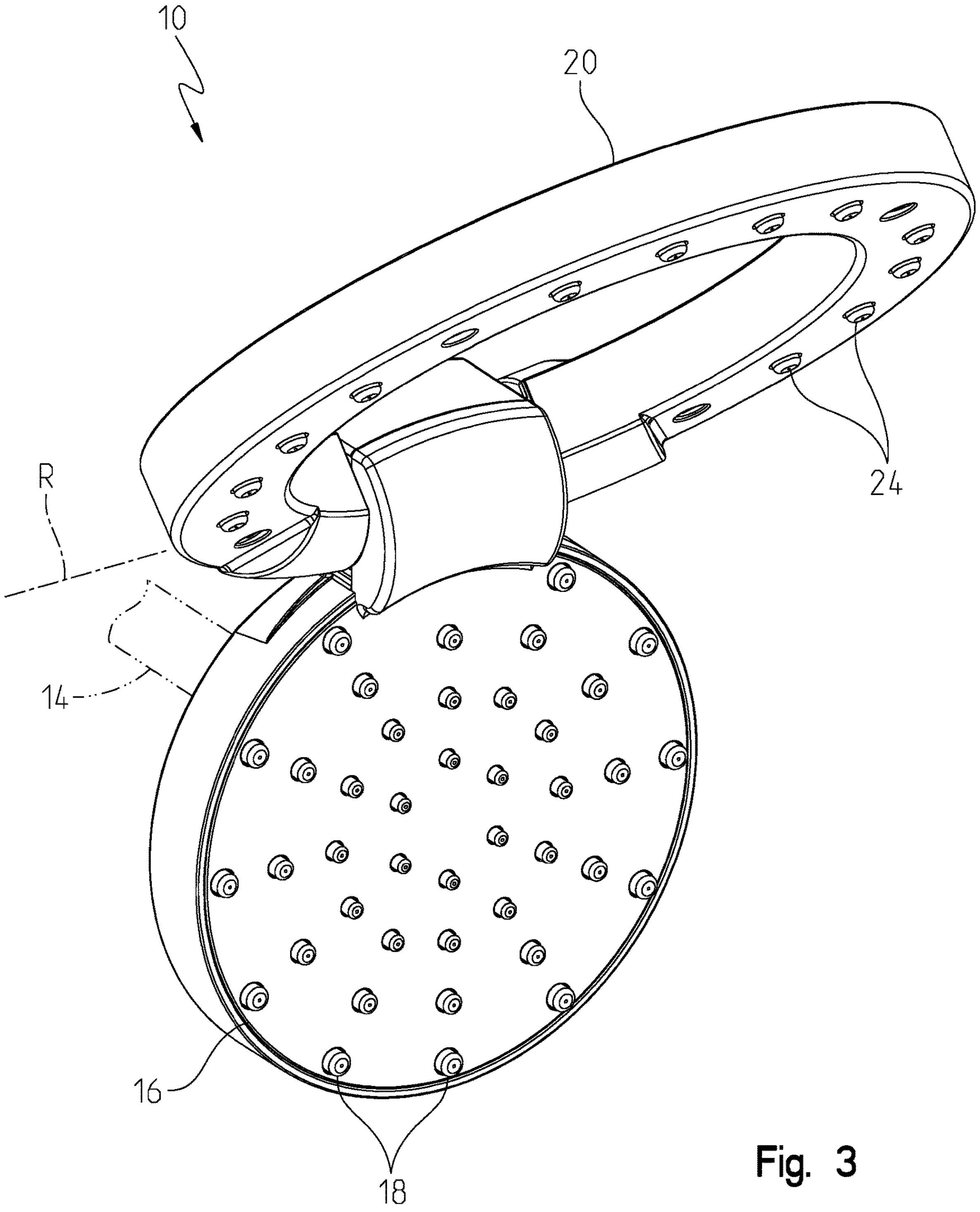
FIG. 3 is a front perspective view of the showerhead of FIG. 1 in a second spray configuration.

Referring initially to FIGS. 1-3, an illustrative showerhead 10 includes a ball and socket connection 12 configured to be fluidly coupled to a conventional shower arm or supply conduit 14 to supply water from a water supply, such as a mixing valve (not shown). The ball and socket connection 12 couples to a first or inner spray portion 16, and the inner spray portion 16 couples to one or more first spray outlets or dispensers 18 that selectively discharge water from the showerhead 10. The inner spray portion 16 also supports a second or outer spray portion 20. The outer spray portion 20 couples to one or more second spray outlets or dispensers 22 and one or more opposed third spray outlets or dispensers 24 that selectively discharge water from the showerhead 10.

The outer spray portion 20 is pivotably reconfigurable by a user about a pivot axis relative to the inner spray portion 16, which causes the showerhead 10 to discharge water from different combinations of the spray outlets 18, 22, and 24. For example, the outer spray portion 20 is movable relative to the inner spray portion 16 from a first spray configuration (FIGS. 1, 2 and 4) to a second spray configuration (FIGS. 3 and 5) to discharge water from different combinations of the spray outlets 18, 22, and 24. As another example, the outer spray portion 20 is movable relative to the inner spray portion 16 from the second spray configuration (FIGS. 3 and 5) to a third spray configuration (FIG. 6) to discharge water from different combinations of the spray outlets 18, 22, and 24, and from the third spray configuration to a fourth spray configuration (FIG. 7) to discharge water from different combinations of the spray outlets 18, 22, and 24. These aspects are described in further detail below.

With continued reference to FIGS. 1-3, the inner spray portion 16 illustratively has a circular or disc shape and the outer spray portion 20 illustratively has a ring shape that at least partially extends around the inner spray portion 16. Alternatively, the inner spray portion 16 and the outer spray portion 20 could have other shapes. For example, the inner spray portion 16 could have a closed square shape and the outer spray portion 20 could have an open square shape that at least partially extends around the inner spray portion 16, or the inner spray portion 16 could have an elliptical shape and the outer spray portion 20 could have an elliptical ring shape that at least partially extends around the inner spray portion 16 Illustratively, the pivot axis R is substantially tangential to the ring shape of the outer spray portion 20 (that is, tangential ±1 inch). Alternatively, the pivot axis R is not substantially tangential to the ring shape of the outer spray portion 20.

The first spray outlets 18, the second spray outlets 22, and the third spray outlets 24 may take various forms. For example, the first spray outlets 18 and the second spray outlets 22 may be conventional nozzles. For example, the first spray outlets 18 and the second spray outlets 22 may be nozzles that discharge water as a gentle stream, commonly known as a "raincan" stream. As another example, the third spray outlets 24 may include a combination of multi-dimensional fluid dispensers (for example, fluidic chips), such as any of those described in U.S. Pat. App. Pub. No. 2013/0299608, and/or scanner nozzles, such as any of those described in U.S. Pat. No. 10,399,094, the disclosures of which are hereby expressly incorporated by reference in their entireties. As another example and referring specifically to FIG. 2, the third spray outlets 24 may include a combination of raincan nozzles 24*a* and multi-dimensional fluid dispensers 24*b*. As is known, the multi-dimensional fluid dispenser 24*b* is configured to produce a stream or jet of water moving in at least two dimensions. Illustratively, the fluid dispensers 24*b* are low-pressure, feedback passage-free fluidic oscillators which provide patternization, spray distribution across a fan angle, shape, and/or articulate a water spray. Illustratively, the fluid dispensers 24*b* may be of the type manufactured by Bowles Fluidics Corporation of Columbia, Md., USA. Alternatively, the first spray outlets 18, the second spray outlets 22, and the third spray outlets 24 may be other types of nozzles.

Figure 4:
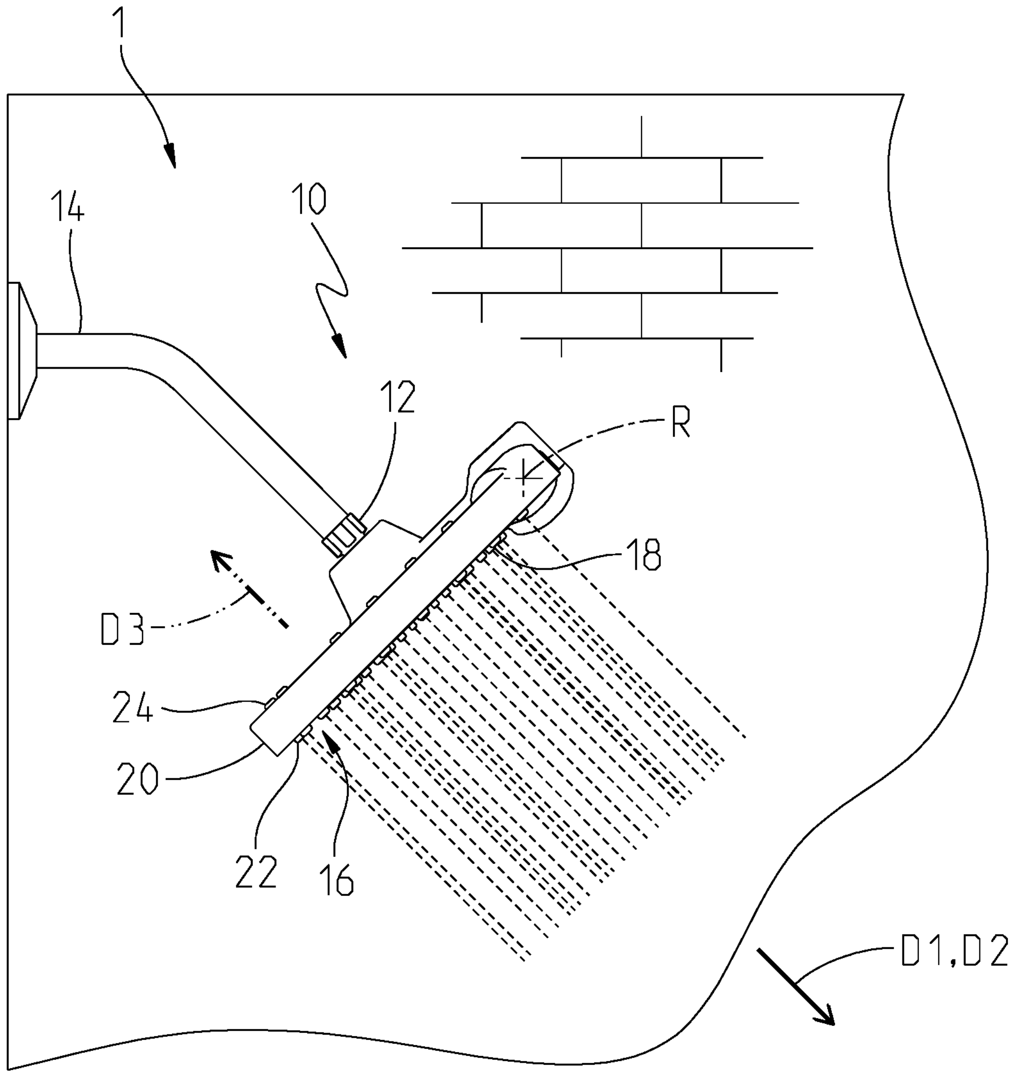
FIG. 4 is a side elevational view of an illustrative shower system including the showerhead of FIG. 1 and illustrating the showerhead in the first spray configuration.

FIGS. 4-7 illustrate a shower system 1 including the showerhead 10 and the supply conduit 14, and the showerhead 10 is illustrated in various spray configurations. More specifically, FIG. 4 illustrates the showerhead 10 in the illustrative first spray configuration. In the illustrative first spray configuration, the outer spray portion 20 is disposed in a common plane with the inner spray portion 16 and at least partially extends around the inner spray portion 16. In addition, the first spray outlets 18 discharge water in a first discharge direction D1, and the second spray outlets 22 discharge water in a second discharge direction D2 substantially parallel to the first discharge direction D1 (that is, parallel±5 degrees). In the illustrated embodiment, the first spray outlets 18 and the second spray outlets 22 together provide a raincan stream in the first spray configuration. In the illustrative first spray configuration, the third spray outlets 24 face in a third discharge direction D3 substantially opposite the first discharge direction D1 and the second discharge direction D2 (that is, 180 degrees apart±5 degrees), but do not discharge water.

Figure 5:
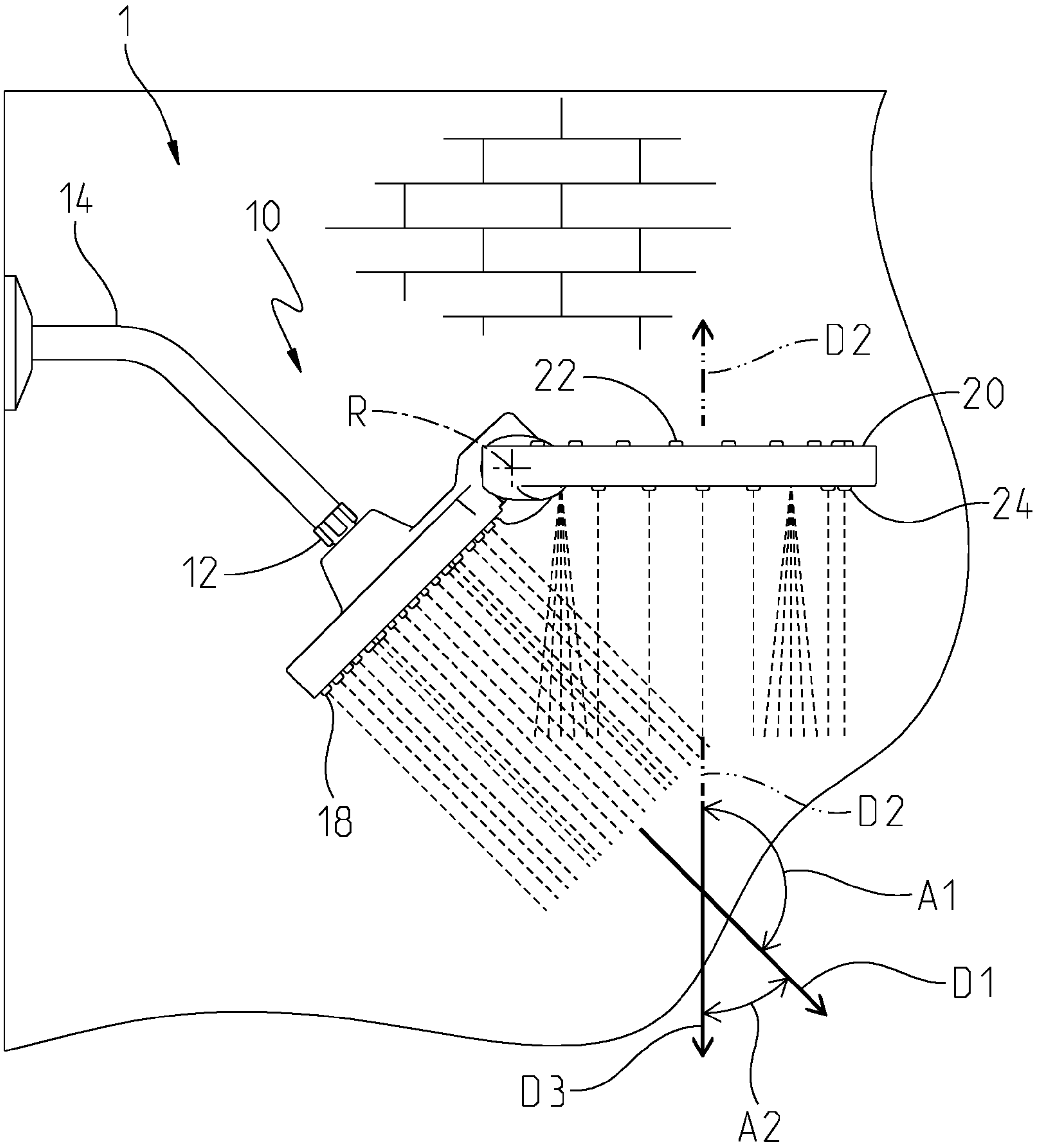
FIG. 5 is a side elevational view of the shower system of FIG. 4 illustrating the showerhead in the second spray configuration.

FIG. 5 illustrates the showerhead 10 in the illustrative second spray configuration. In the illustrative second spray configuration, the outer spray portion 20 is pivotably offset by an angle A1 from its position in the illustrative first spray configuration. As a result, the second discharge direction D2 of the second spray outlets 22 is pivotably offset by the angle A1 from the first discharge direction D1 of the first spray outlets 18, and the third discharge direction D3 of the third spray outlets 24 is pivotably offset by a supplementary angle A2 from the first discharge direction D1 of the first spray outlets 18. The angle A1 may be, for example, in a range of 12.5 degrees to 145 degrees, more specifically in a range of 130 degrees to 140 degrees, and more specifically 135 degrees. The angle A2 may be, for example, in a range of 35 degrees to 55 degrees, more specifically in a range of 40 degrees to 50 degrees, and more specifically 45 degrees. In the illustrative second spray configuration, the first spray outlets 18 discharge water in the first discharge direction D1, the third spray outlets 24 discharge water in the third discharge direction D3, and the second spray outlets 22 do not discharge water. In the illustrated embodiment, the first spray outlets 18 and the third spray outlets 24 together provide a hybrid raincan/massaging stream in the second spray configuration.

Figure 6:
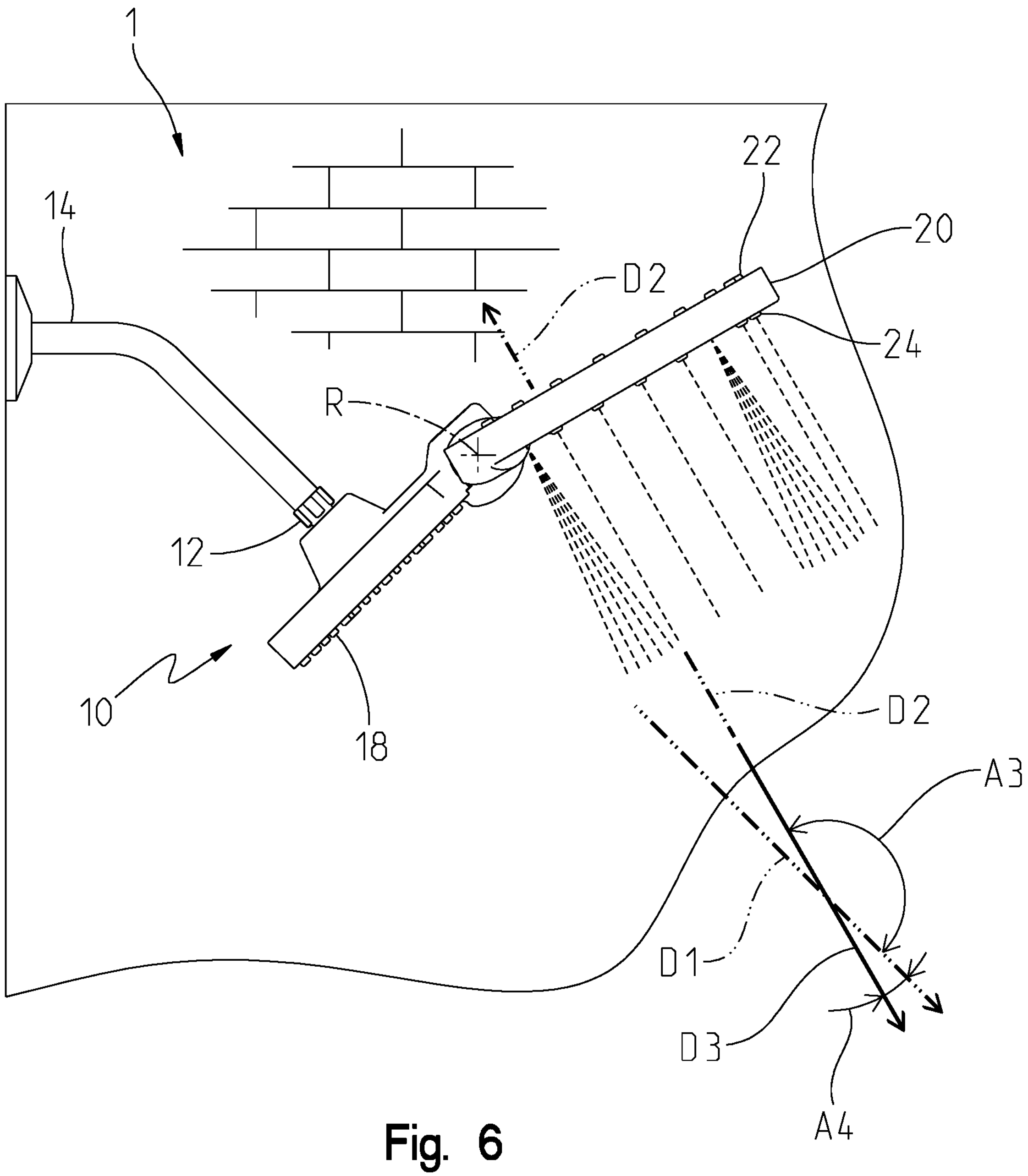
FIG. 6 is a side elevational view of the shower system of FIG. 4 illustrating the showerhead in a third spray configuration.

FIG. 6 illustrates the showerhead 10 in the illustrative third spray configuration. In the illustrative third spray configuration, the outer spray portion 20 is pivotably offset by an angle A3 from its position in the illustrative first spray configuration. As a result, the second discharge direction D2 of the second spray outlets 22 is pivotably offset by the angle A3 from the first discharge direction D1 of the first spray outlets 18, and the third discharge direction D3 of the third spray outlets 24 is pivotably offset by a supplementary angle A4 from the first discharge direction D1 of the first spray outlets 18. The angle A3 may be, for example, in a range of 155 degrees to 175 degrees, more specifically in a range of 160 degrees to 170 degrees, and more specifically 165 degrees. The angle A4 may be, for example, in a range of 5 degrees to 25 degrees, more specifically in a range of 10 degrees to 20 degrees, and more specifically 15 degrees. In the illustrative third spray configuration, the third spray outlets 24 discharge water in the third discharge direction D3, and the first spray outlets 18 and the second spray outlets 22 do not discharge water. In the illustrated embodiment, the third spray outlets 24 provide a massaging stream in the third spray configuration.

Figure 7:
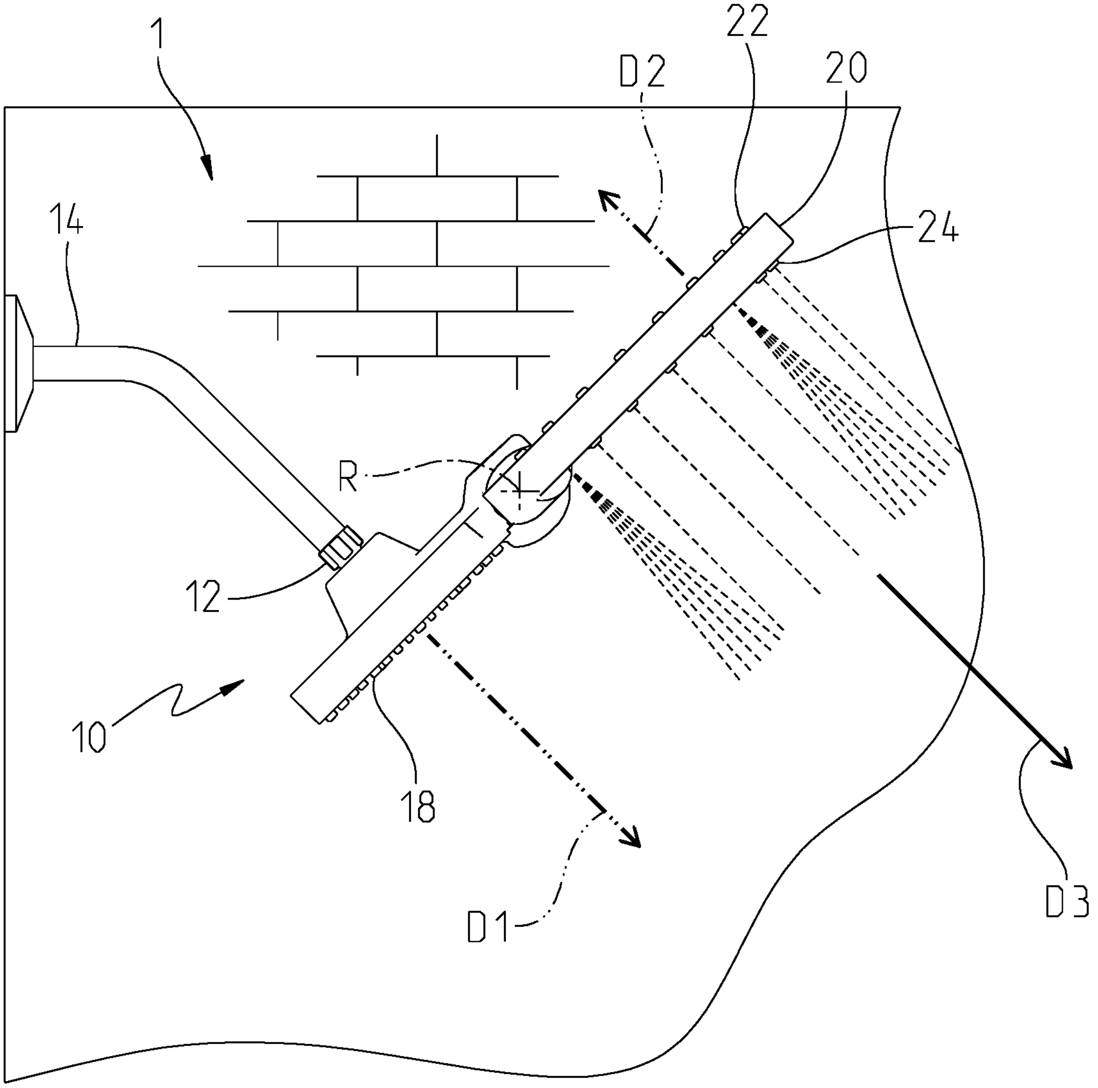
FIG. 7 is a side elevational view of the shower system of FIG. 4 illustrating the showerhead in a fourth spray configuration.

FIG. 7 illustrates the showerhead 10 in the illustrative fourth spray configuration. In the illustrative fourth spray configuration, the outer spray portion 20 is substantially opposite from its position in the illustrative first spray configuration. As a result, the second discharge direction D2 of the second spray outlets 22 is substantially opposite the first discharge direction D1 of the first spray outlets 18, and the third discharge direction D3 of the third spray outlets 24 is substantially parallel to the first discharge direction D1 of the first spray outlets 18. In the illustrative fourth spray configuration, the third spray outlets 24 discharge water in the third discharge direction D3, and the first spray outlets 18 and the second spray outlets 22 do not discharge water. In the illustrated embodiment, the third spray outlets 24 provide a massaging stream in the fourth spray configuration.

Figure 8:
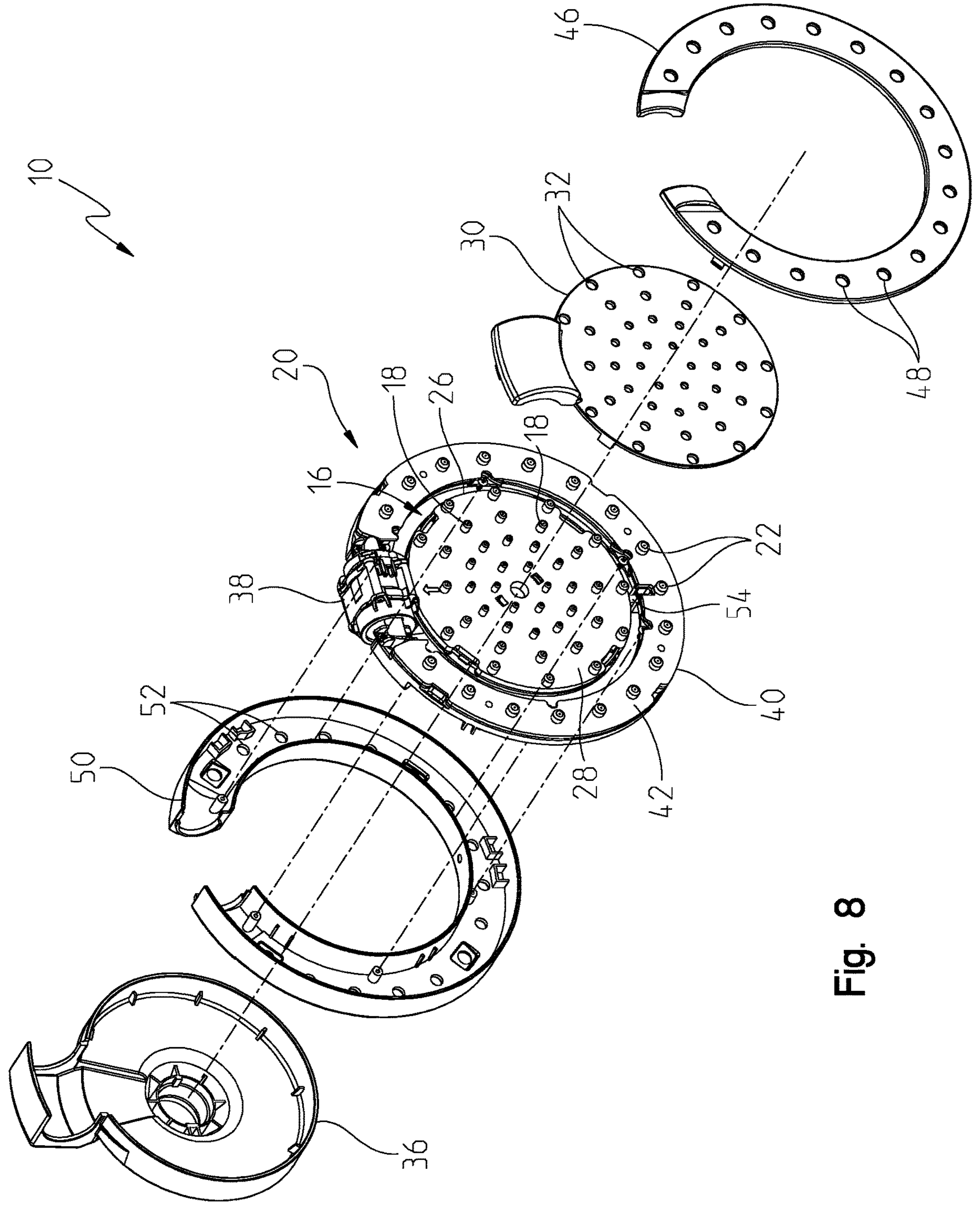
FIG. 8 is an exploded front perspective view of the showerhead of FIG. 1.
Figure 9:
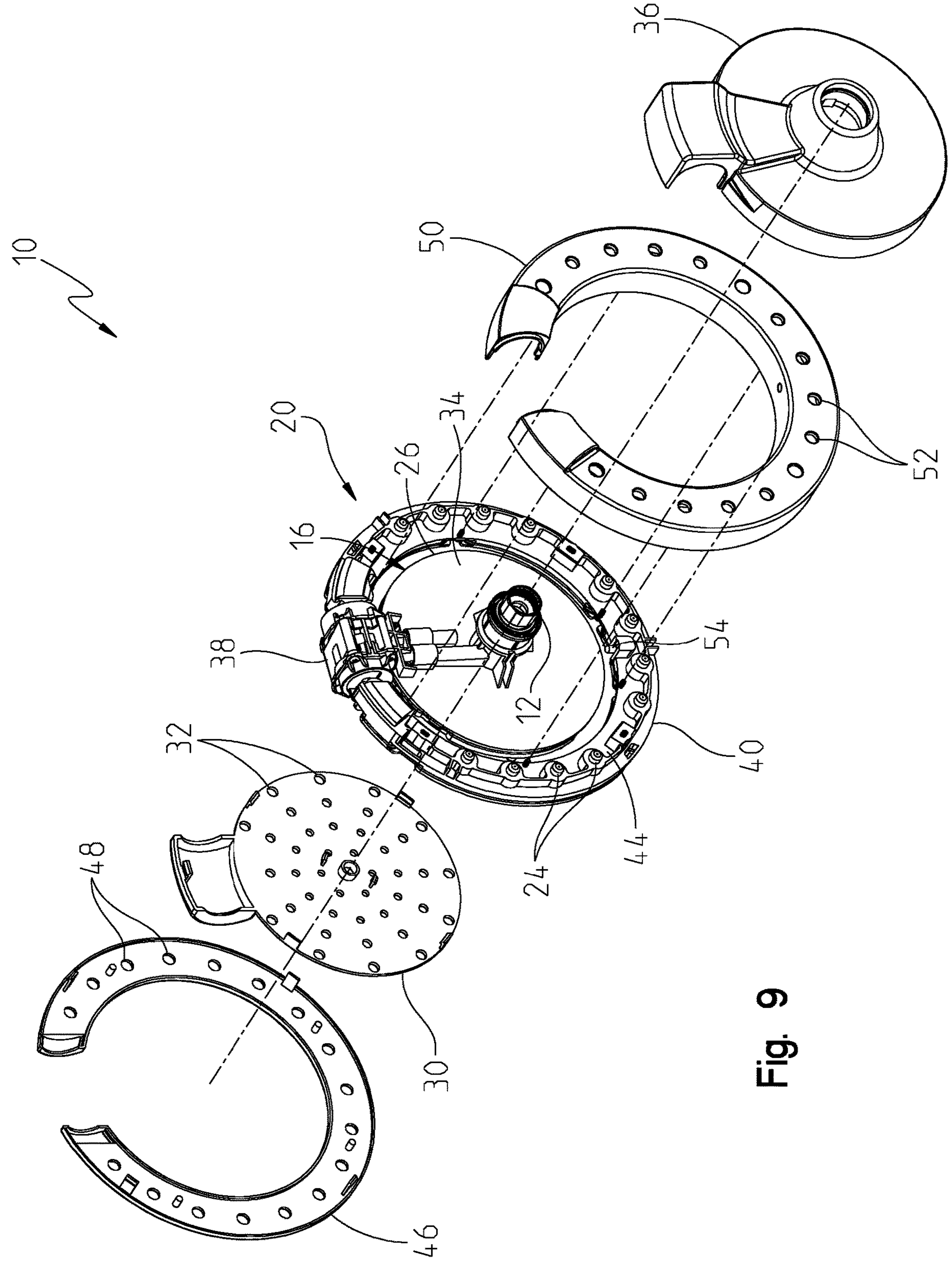
FIG. 9 is an exploded rear perspective view of the showerhead of FIG. 1.

FIGS. 8 and 9 are exploded views of the illustrative showerhead 10. Illustratively, the inner spray portion 16 includes an inner base 26 that couples to the first spray outlets 18 on a front surface 28 (FIG. 8). The front surface 28 also couples to a front cover or sprayface 30, and the front cover 30 includes a plurality of first apertures 32 through which the first spray outlets 18 extend. An opposite rear surface 34 (FIG. 9) of the inner base 26 couples to the ball and socket connection 12 and a rear cover 36. The inner base 26 couples to the outer spray portion 20 via a hinge or pivot joint 38, which is described in further detail below. Illustratively, the outer spray portion 20 includes an outer base 40 that couples to the second spray outlets 22 on a front surface 42 (FIG. 8) and the third spray outlets 24 on an opposite rear surface 44 (FIG. 9). The front surface 42 (FIG. 8) couples to a front cover or sprayface 46, and the front cover 46 includes a plurality of second apertures 48 through which the second spray outlets 22 extend. The rear surface 44 (FIG. 9) couples to a rear cover or sprayface 50, and the rear cover 50 includes a plurality of third apertures 52 through which the third spray outlets 24 extend.

With continued reference to FIGS. 8 and 9, the illustrative showerhead 10 also includes a first seeming element 54 for securing the outer spray portion 20 to the inner spray portion 16 in one or more configurations. Illustratively, the first securing element 54 includes a spring-biased pin carried by the outer spray portion 20 and contacting the inner spray portion 16. The first securing element 54 secures the outer spray portion 20 to the inner spray portion 16 in the first spray configuration, as detailed above. A user may reconfigure the showerhead 10 by applying a force to the outer spray portion 20 sufficient to overcome a securing force provided by the first securing element 54. In alternative embodiments, the first securing element 54 may take other forms. For example, the first securing element 54 could include a spring-biased pin carried by the inner spray portion 16 and contacting the outer spray portion 20.

Figure 10:
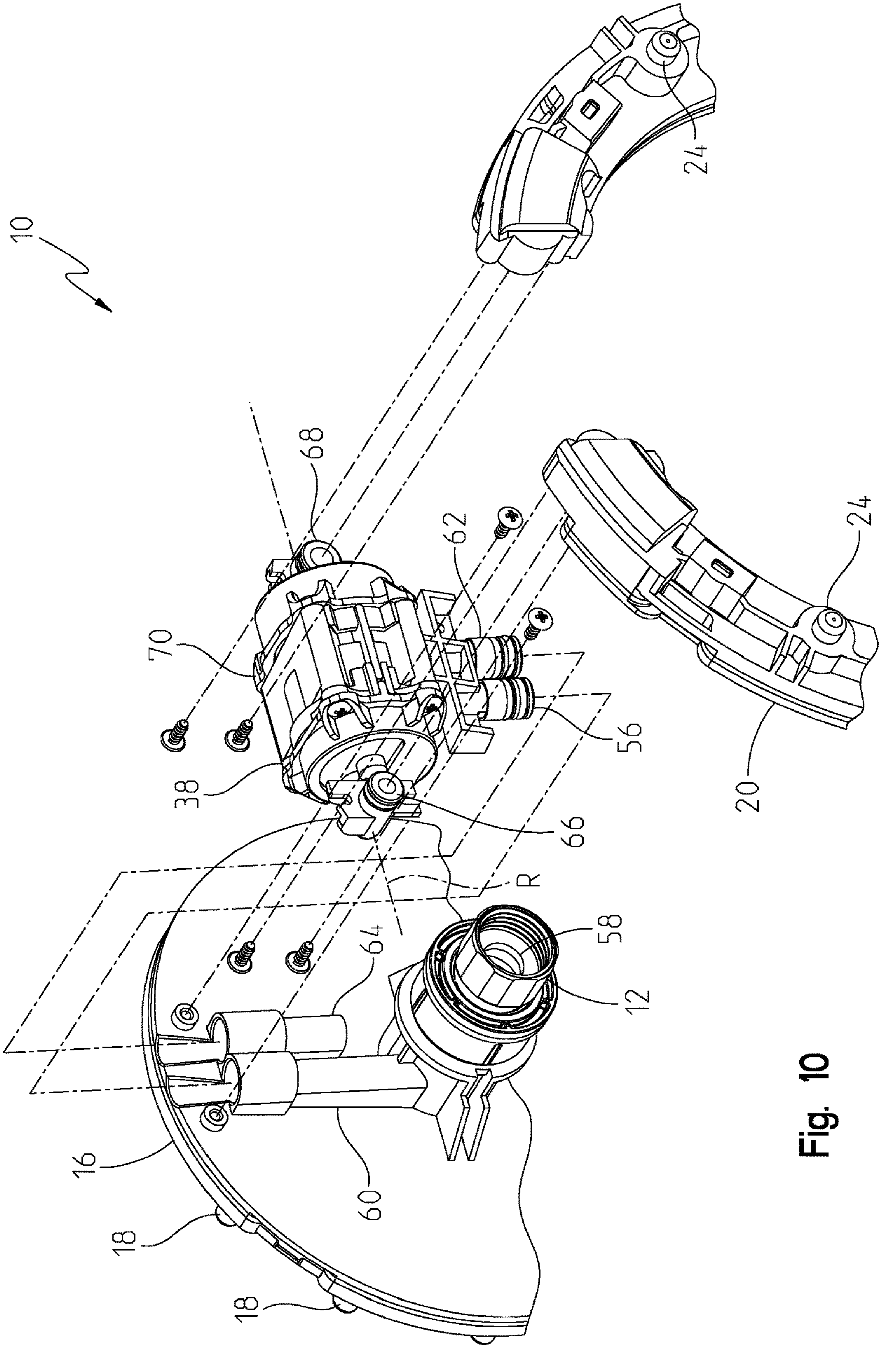
FIG. 10 is an exploded rear partial perspective view of an inner spray portion, an outer spray portion, and a hinge of the showerhead of FIG. 1, wherein covers of the inner spray portion and the outer spray portion are omitted for clarity.
Figure 11:
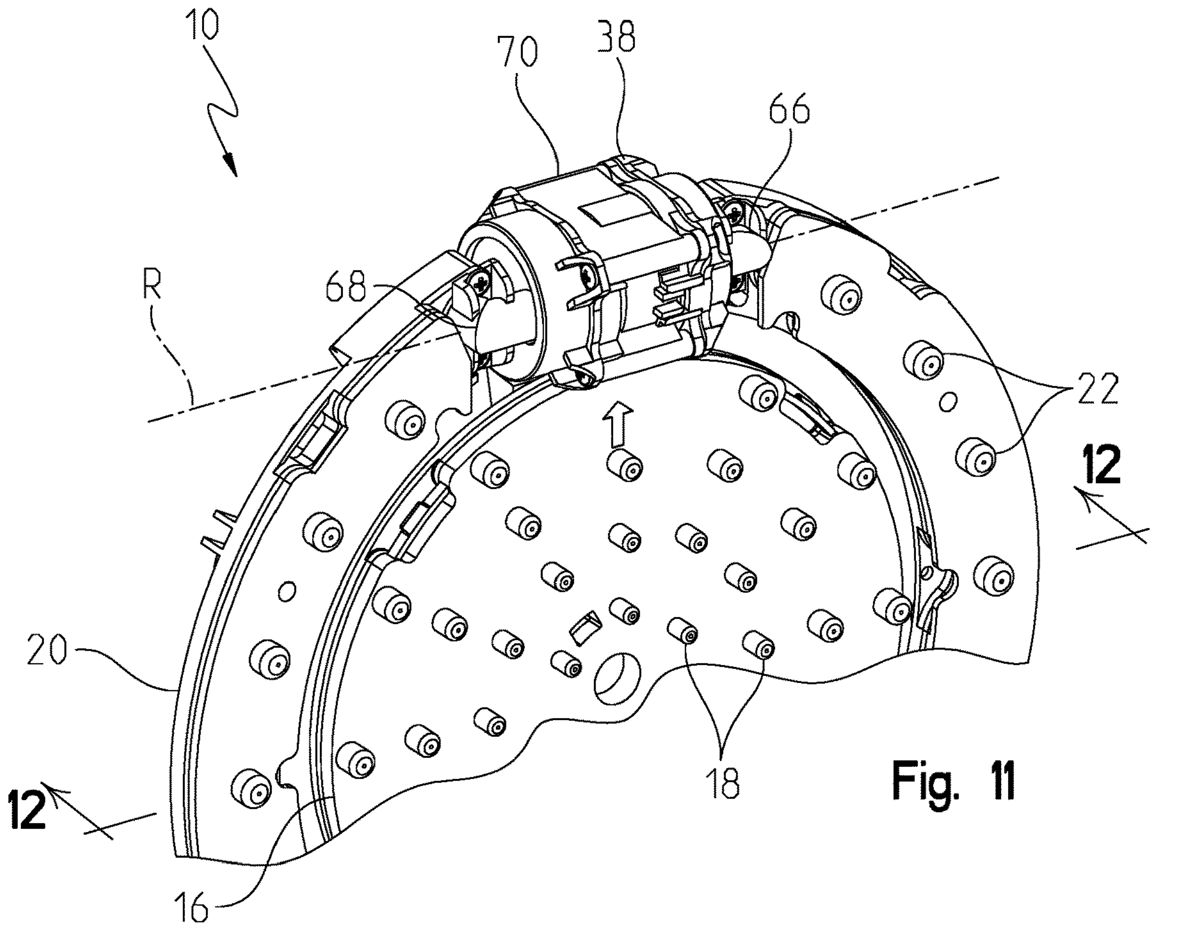
FIG. 11 is a front partial perspective view of the inner spray portion, the outer spray portion, and the hinge of the showerhead of FIG. 1, wherein covers of the inner spray portion and the outer spray portion are omitted for clarity.
Figure 15:
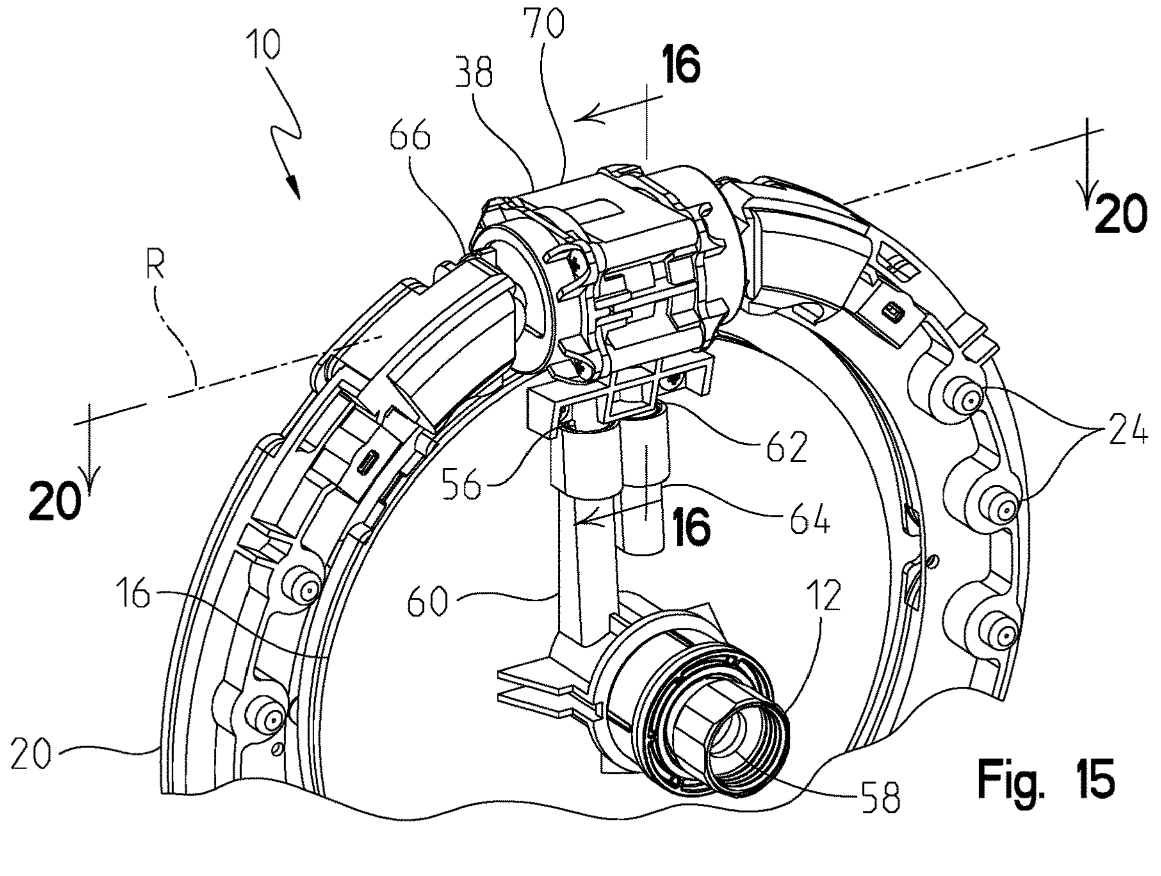
FIG. 15 is a rear partial perspective view of the inner spray portion, the outer spray portion, and the hinge of the showerhead of FIG. 1, wherein covers of the inner spray portion and the outer spray portion are omitted for clarity.

FIGS. 10, 11 and 15 further illustrate the hinge 38 of the illustrative showerhead 10. As described briefly above, the hinge 38 pivotably couples the inner spray portion 16 and the outer spray portion 20. The hinge 38 also acts as a valve assembly for selectively providing water to the first spray outlets 18, the second spray outlets 22, and the third spray outlets 24. Internal components and passageways of the hinge 38 that facilitate selectively delivering water to the spray outlets 18, 22, and 24 are described in further detail below. Generally, however, the hinge 38 includes a hinge inlet conduit 56 in fluid communication with a showerhead inlet 58, which is illustratively provided by the ball and socket connection 12, via an intermediate inlet conduit 60 coupled to the inner spray portion 16. The hinge inlet conduit 56 is in fluid communication with and selectively delivers water to a first hinge outlet conduit 62, which is in fluid communication with an intermediate outlet conduit 64 coupled to the inner spray portion 16. The intermediate outlet conduit 64 is in fluid communication with the first spray outlets 18 of the inner spray portion 16. The hinge inlet conduit 56 is also in fluid communication with and selectively delivers water to a second hinge outlet conduit 66, which is in fluid communication with the second spray outlets 22 of the outer spray portion 20. The hinge inlet conduit 56 is further in fluid communication with and selectively delivers water to a third hinge outlet conduit 68, which is in fluid communication with the third spray outlets 24 of the outer spray portion 20. Both the second hinge outlet conduit 66 and the third hinge outlet conduit 68 are supported by a housing 70 of the hinge 38 for pivotal movement about the pivot axis R. As a result, the second hinge outlet conduit 66 and the third hinge outlet conduit 68 facilitate pivoting and reconfiguring the outer spray portion 20 relative to the inner spray portion 16 in the various spray configurations described above.

Figure 12:
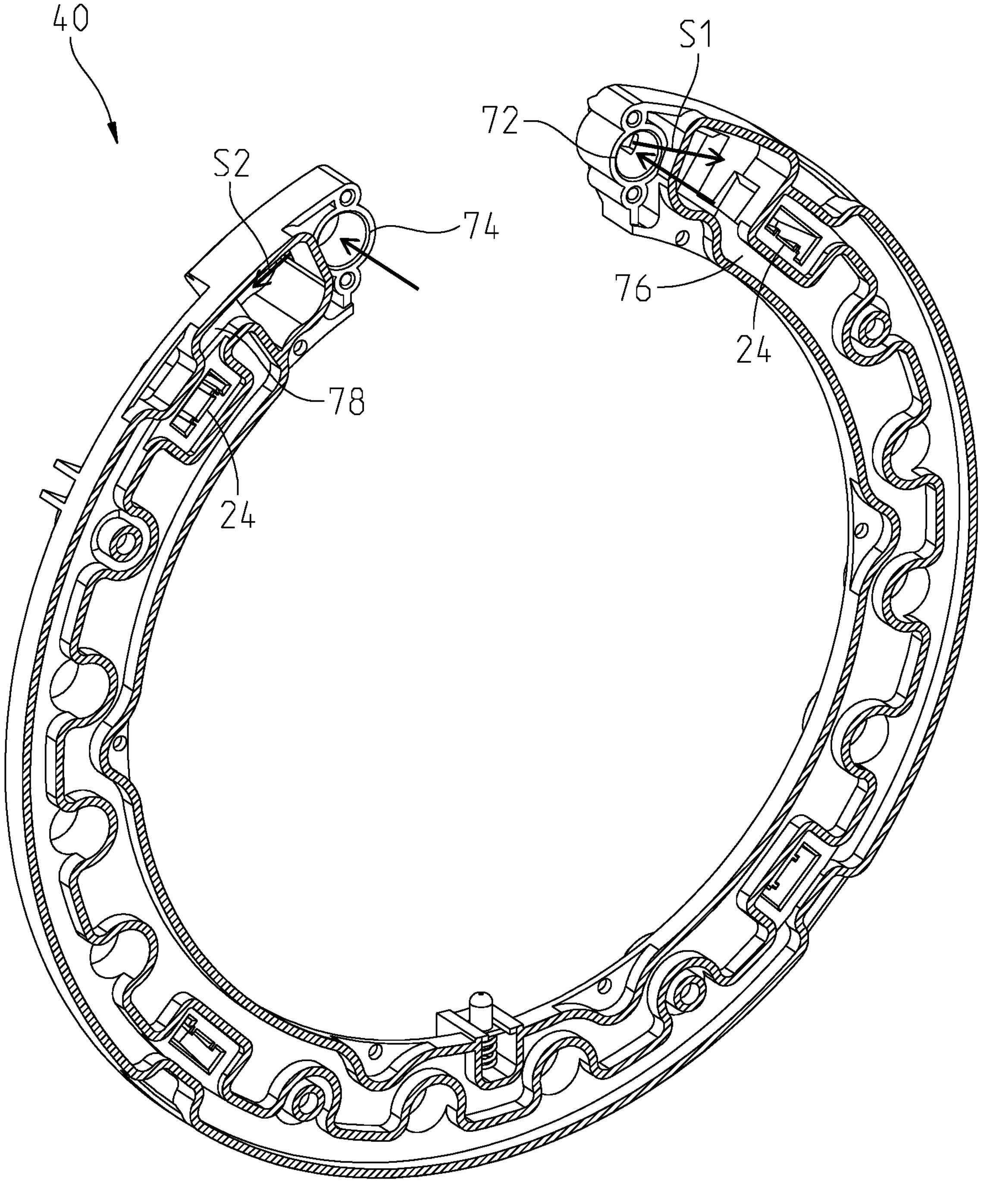
FIG. 12 is a perspective cross-sectional view of the outer spray portion taken along line 12-12 of FIG. 11.

FIG. 12 is a cross-sectional view further illustrating the outer base 40 of the outer spray portion 20. The outer base 40 includes a first outer inlet 72 and an opposite second outer inlet 74 that couple to and are in fluid communication with the second hinge outlet conduit 66 and third hinge outlet conduit 68 (shown elsewhere), respectively. The first outer inlet 72 is in fluid communication with a first, or inner, outer passageway 76. As a result, water flows from the first outer inlet 72 along flow path S1 to the first outer passageway 76. The first outer passageway 76 extends around the perimeter of the outer spray portion 20 (illustratively, its inner perimeter) and is in fluid communication with the second spray outlets 22 (shown elsewhere). That is, the first outer passageway 76 delivers water to the second spray outlets 22 for discharging from the showerhead 10. Similarly, the second outer inlet 74 is in fluid communication with a second, or outer, outer passageway 78. As a result, water flows from the second outer inlet 74 along flow path S2 to the second outer passageway 78. The second outer passageway 78 extends around the perimeter of the outer spray portion 20 (illustratively, its outer perimeter) and is in fluid communication with the third spray outlets 24. That is, the second outer passageway 78 delivers water to the third spray outlets 24 for discharging from the showerhead 10.

Figure 13:
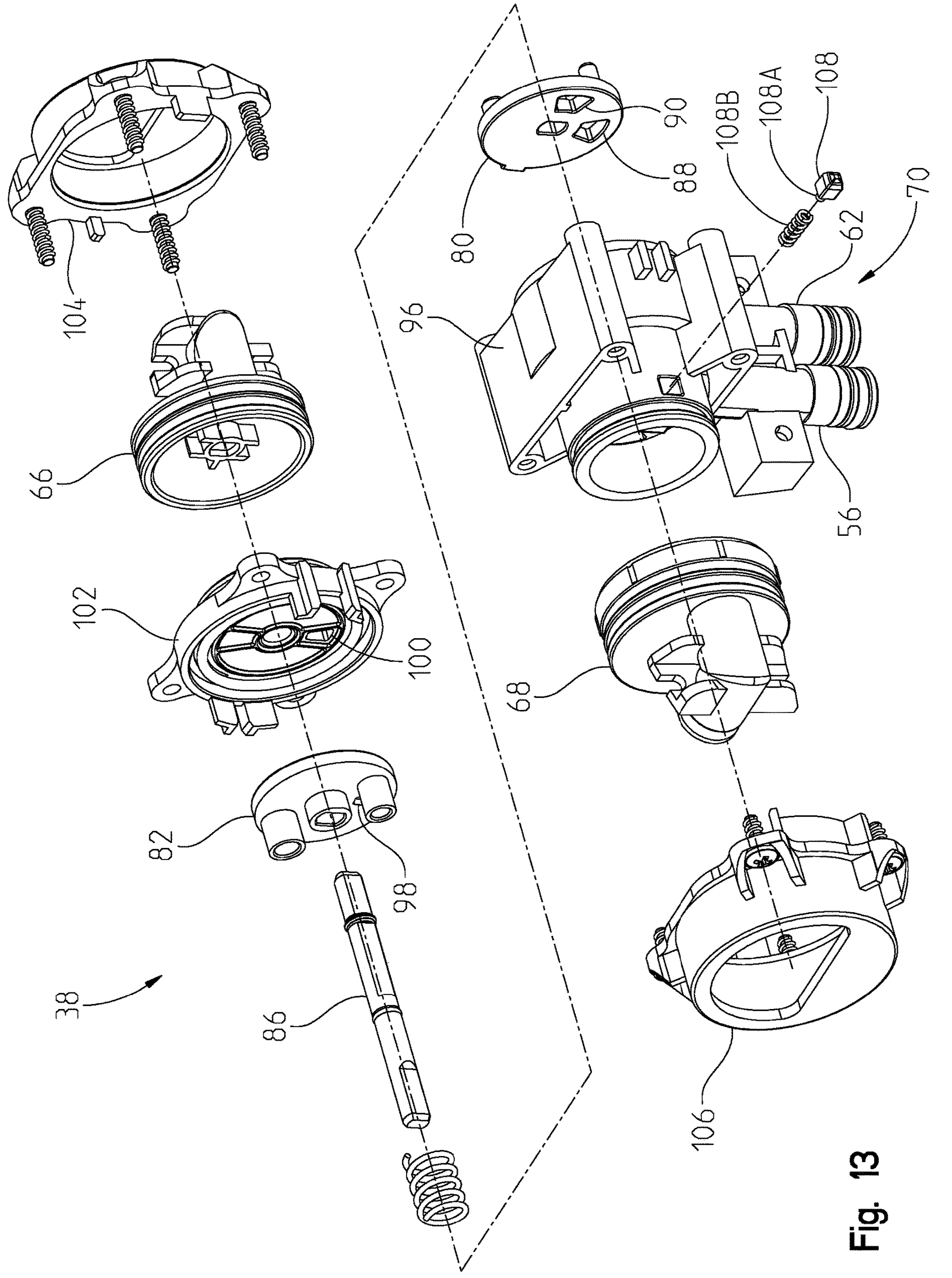
FIG. 13 is an exploded front perspective view of the hinge of the showerhead of FIG. 1.
Figure 14:
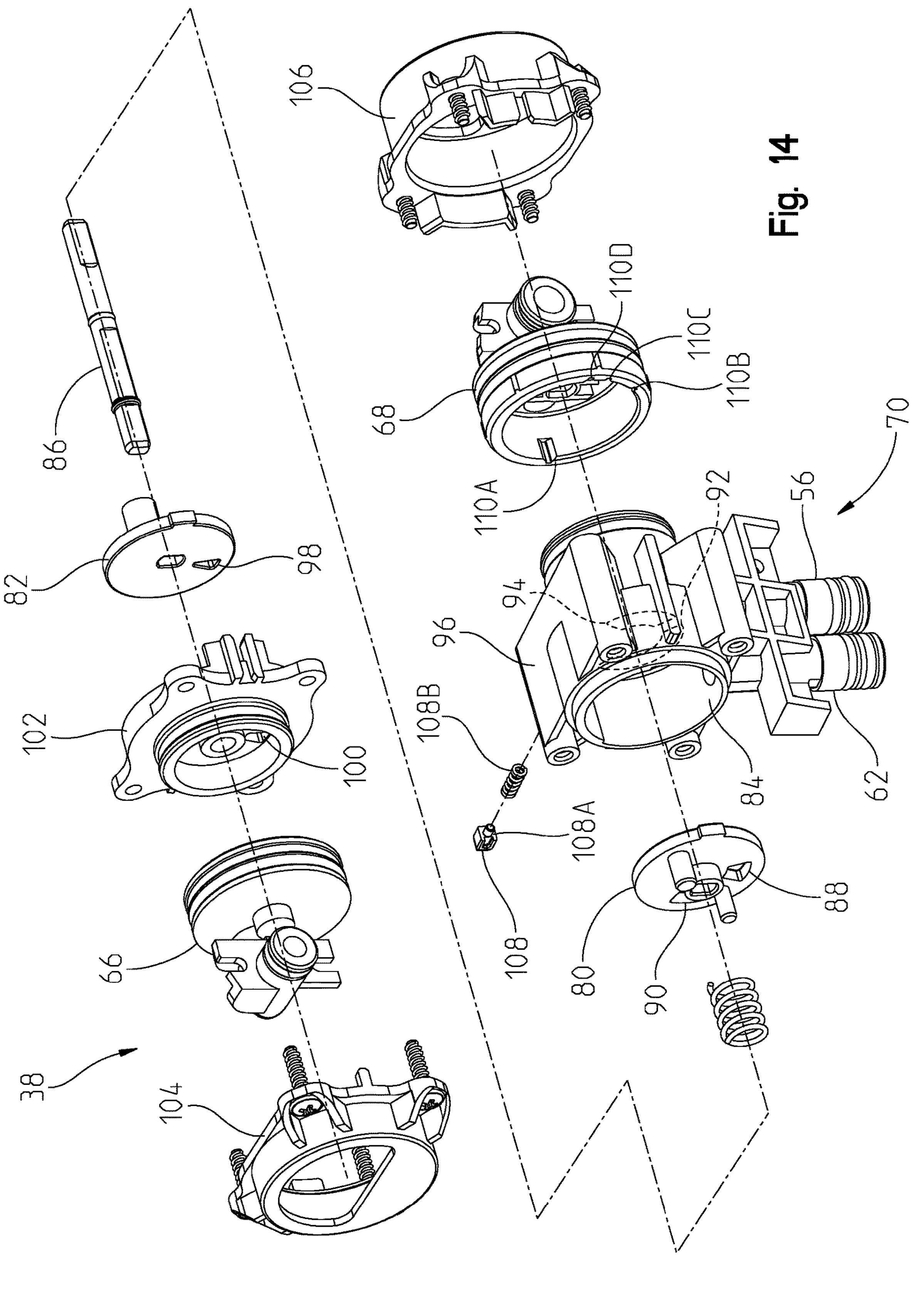
FIG. 14 is an exploded rear perspective view of the hinge of the showerhead of FIG. 1.

FIGS. 13 and 14 are exploded views of the hinge 38 illustrating internal components and passageways that facilitate selectively delivering water to the first spray outlets 18, the second spray outlets 22, and the third spray outlets 24 (shown elsewhere). More specifically, the housing 70 of the hinge 38 pivotably carries a first flow control member 80 and a second flow control member 82 within an inner chamber 84 (FIG. 14) and on a common shaft 86. The first flow control member 80 includes a first flow control aperture 88 and a third flow control aperture 90 that are selectively and rotatably alignable with a first housing aperture 92 (FIG. 14) and a third housing aperture 94 of a first housing portion 96 of the housing 70. The first housing aperture 92 and the third housing aperture 94 are in fluid communication with the first hinge outlet conduit 62 and the third hinge outlet conduit 68, respectively. Similarly, the second flow control member 82 includes a second flow control aperture 98 that is selectively and rotatably alignable with a second housing aperture 100 of a second housing portion 102 of the housing 70. The second housing aperture 100 is in fluid communication with the second hinge outlet conduit 66.

The housing 70 of the hinge 38 also pivotally carries the second hinge outlet conduit 66 and the third hinge outlet conduit 68 on the shaft 86. As a result, the second hinge outlet conduit 66, the third hinge outlet conduit 68, the first flow control member 80, the second flow control member 82, the shaft 86, and the outer spray portion 20 (shown elsewhere) pivot together about the pivot axis R (shown elsewhere) relative to the housing 70 of the hinge 38 and the inner spray portion 16 (shown elsewhere). The housing 70 further includes a first cover 104 and a second cover 106 through which the second hinge outlet conduit 66 and the third hinge outlet conduit 68 extend, respectively. The first cover 104 pivotably secures the second hinge outlet conduit 66 to the second housing portion 102, and the first cover 104 secures the second housing portion 102 to the first housing portion 96. The second cover 106 pivotably secures the third hinge outlet conduit 68 to the first housing portion 96.

Figure 16:
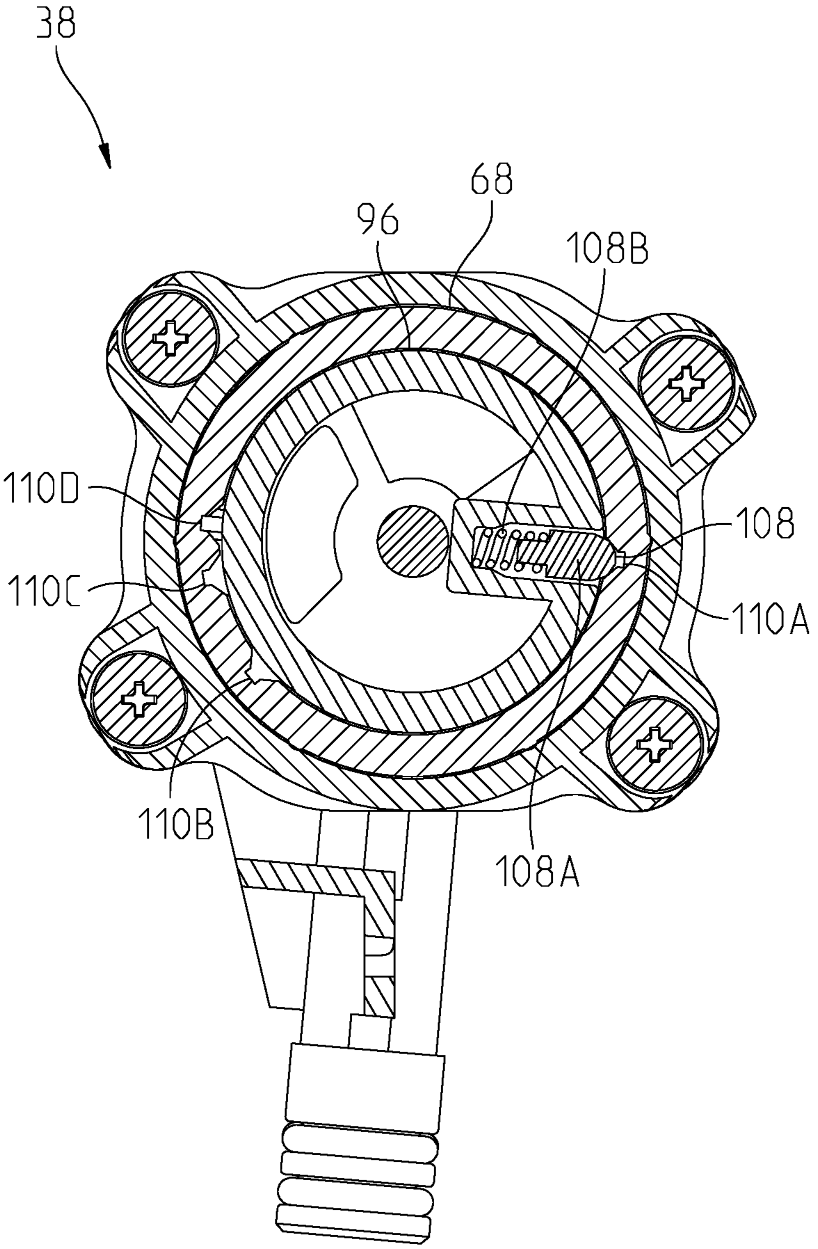
FIG. 16 is a transverse sectional view of the hinge taken along line 16-16 of FIG. 15.
Figure 17:
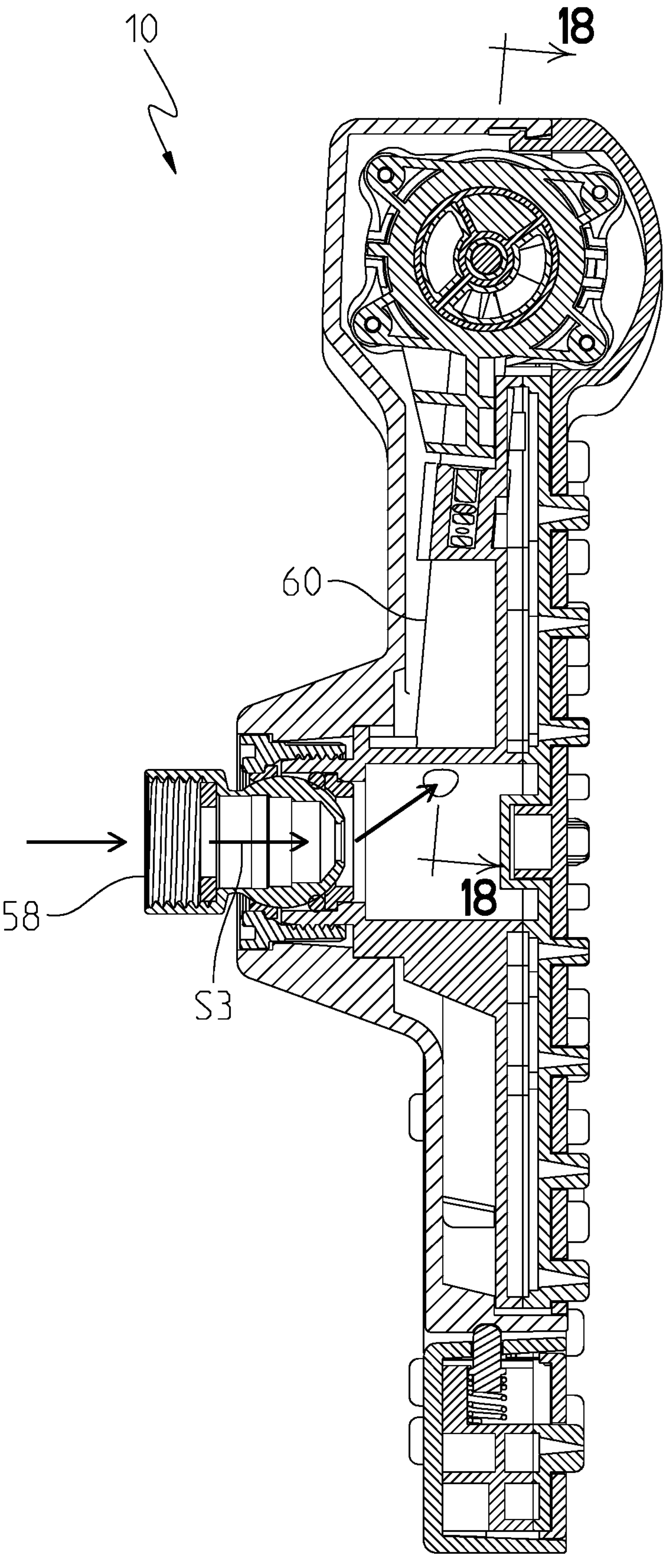
FIG. 17 is a transverse sectional view of the showerhead taken along line 17-17 of FIG. 1.

With continued reference to FIGS. 13 and 14 and additional reference to FIG. 16, the hinge 38 also includes a second securing element 108 for securing the outer spray portion 20 to the inner spray portion 16 (both shown elsewhere) in one or more spray configurations. Illustratively, the second securing element 108 includes a pin 108A biased by a spring 108B and carried by the first housing portion 96 and received in one or more recesses 110 formed on the third hinge outlet conduit 68. Illustratively, the third hinge outlet conduit 68 includes a first recess 110A, a second recess 110B, a third recess 110C, and a fourth recess 110D for receiving the spring-biased pin 108 in the first spray configuration, the second spray configuration, the third spray configuration, and the fourth spray configuration, respectively, as detailed above. As shown, the recesses 110A, 110B, 110C, 110D are illustratively circumferentially spaced. In the illustrative configurations, a user may reconfigure the showerhead 10 by applying a force to the outer spray portion 20 sufficient to overcome a securing force provided by the second securing element 108. In alternative embodiments, the second securing element 108 may take other forms. For example, the second securing element 108 could include a spring-biased pin carried by the third hinge outlet conduit 68 and one or more recesses 110 formed on the first housing portion 96.

Figure 18:
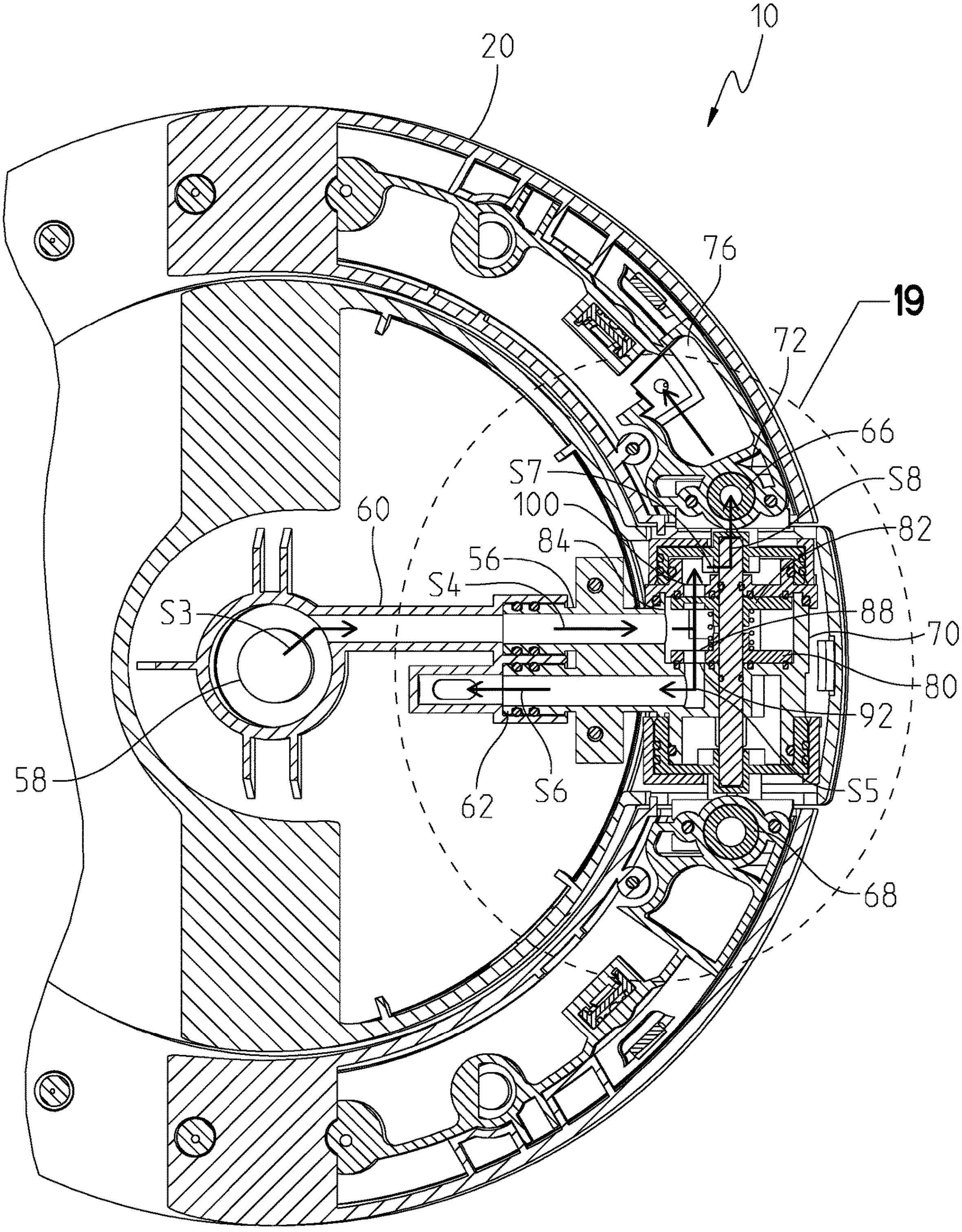
FIG. 18 is a cross-sectional view of the showerhead taken along line 18-18 of FIG. 17.
Figure 19:
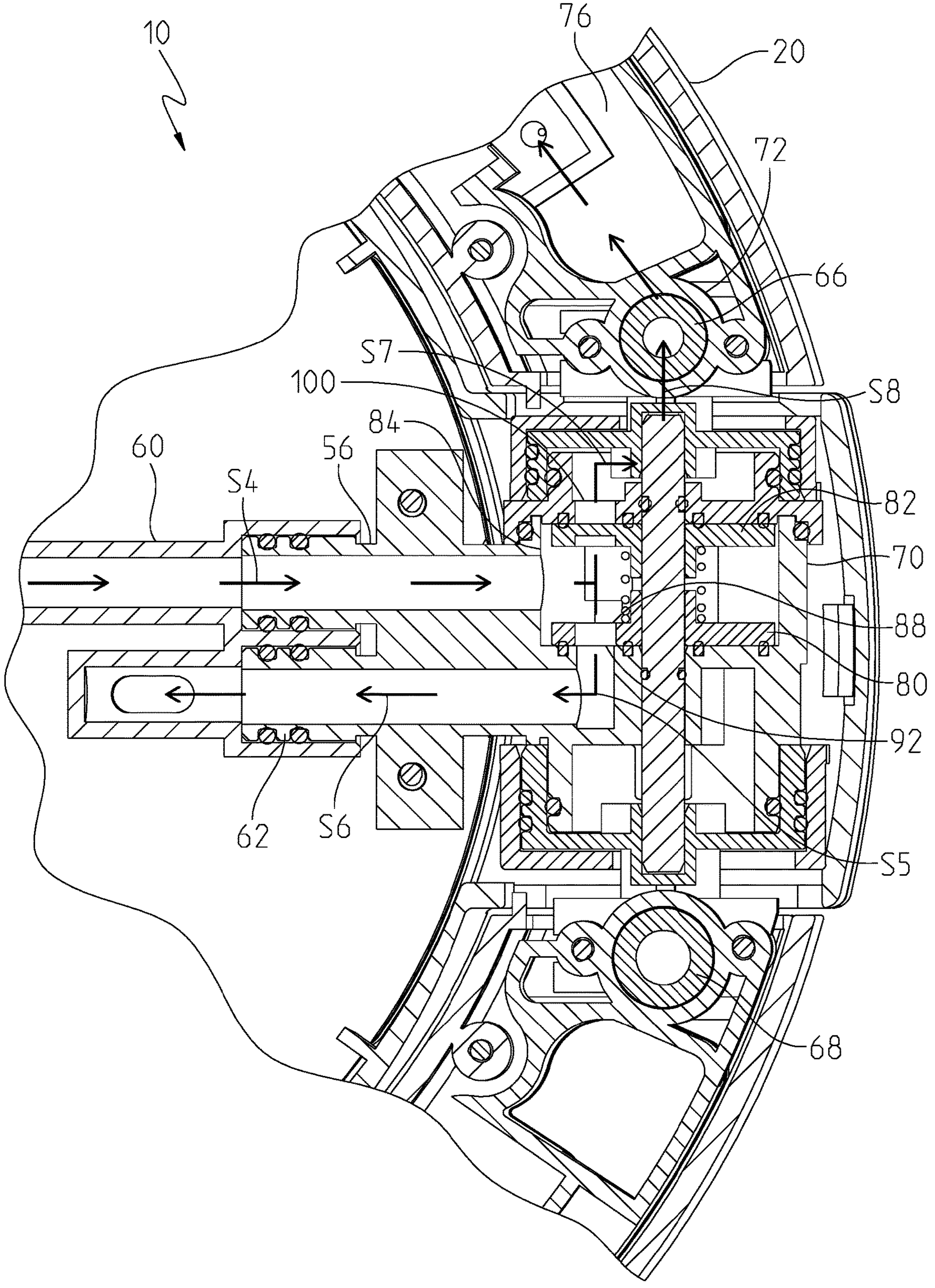
FIG. 19 is a detail cross-sectional view of the showerhead within line 19 of FIG. 18.
Figure 20:
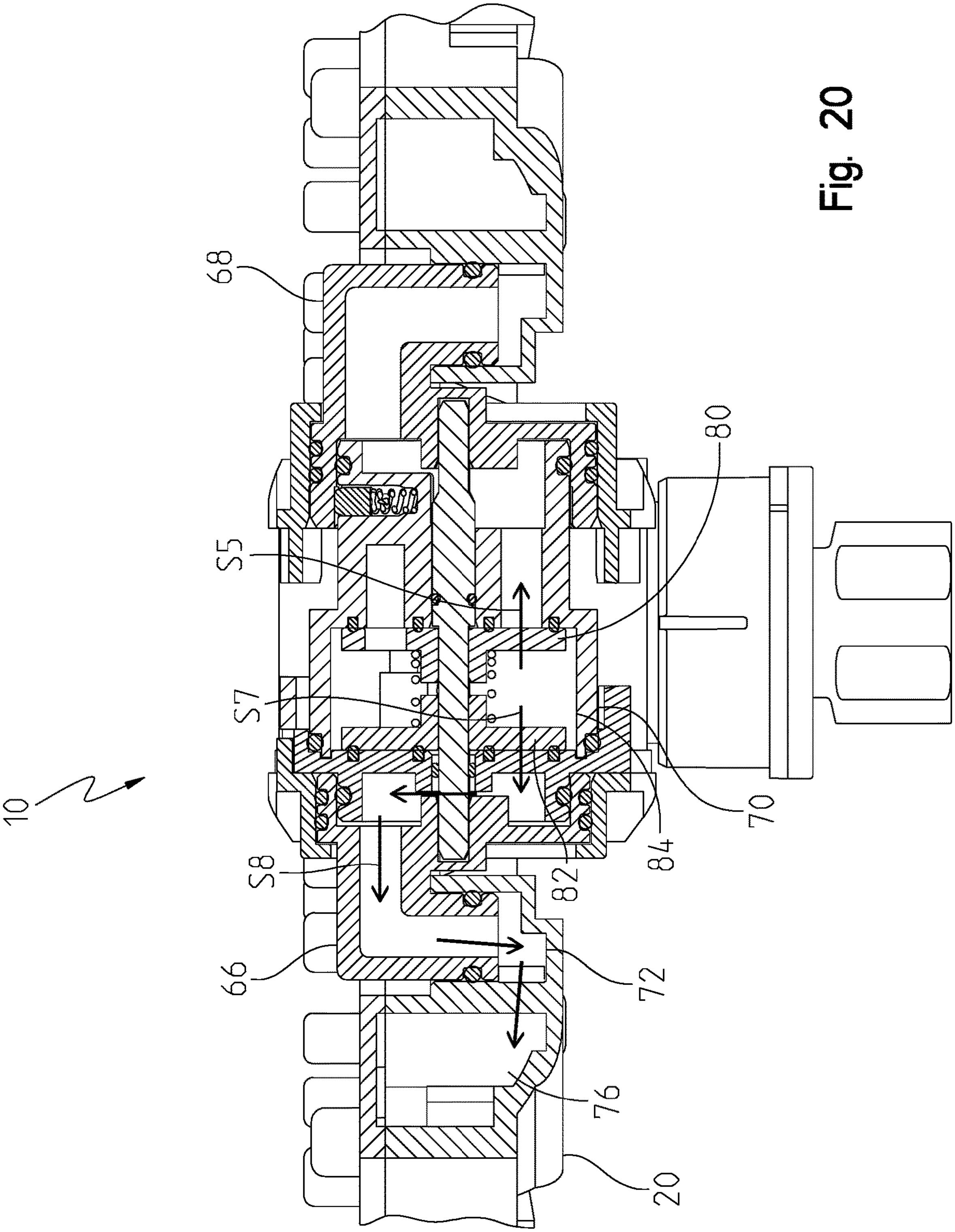
FIG. 20 is a transverse sectional view of the showerhead taken along line 20-20 of FIG. 15.
Figure 21:
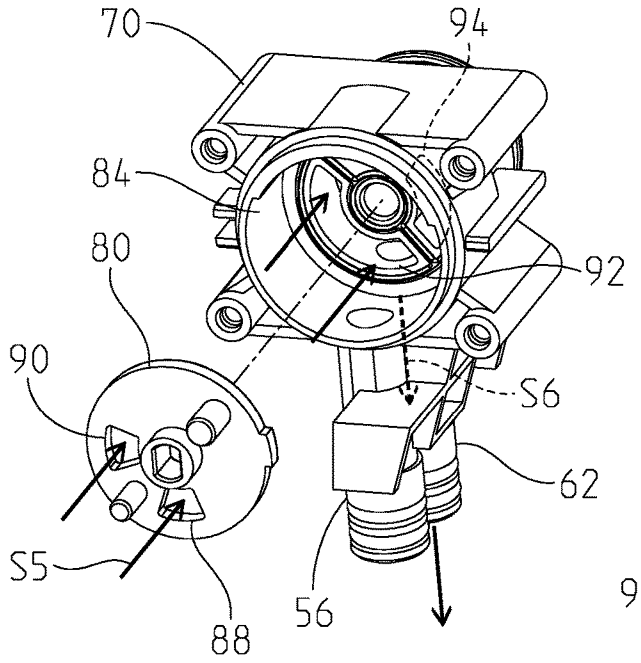
FIG. 21 is an exploded perspective view of a first flow control member and a housing of the hinge in the first spray configuration of the showerhead as illustrated in FIG. 4.
Figure 22:
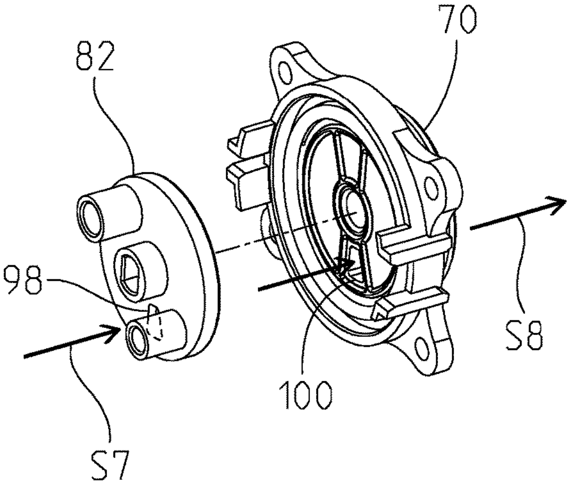
FIG. 22 is an exploded perspective view of a second flow control member and the housing of the hinge in the first spray configuration of the showerhead as illustrated in FIG. 4.

FIGS. 17-28 illustrate flow of water through the showerhead 10 in various spray configurations. FIGS. 17-22 illustrate flow of water through the showerhead 10 in the first spray configuration (that is, as shown in FIG. 4). As shown specifically in FIGS. 17 and 18, water enters the showerhead 10 at the showerhead inlet 58 and flows along flow path S3 to the intermediate inlet conduit 60. As shown in FIGS. 18 and 19, water flows from the intermediate inlet conduit 60 along flow path S4 to the hinge inlet conduit 56 and then the inner chamber 84 of the housing 70. As shown in FIGS. 18-21, water flows from the inner chamber 84 along flow path S5 through the first flow control member 80, specifically through the first flow control aperture 88 and the third flow control aperture 90, and the first housing aperture 92. Water then flows along flow path S6 through the first hinge outlet conduit 62 and ultimately to the first spray outlets 18 (shown elsewhere) for discharge from the showerhead 10. As shown in FIGS. 18-20 and 22, water also flows from the inner chamber 84 along flow path S7 through the second flow control member 82, specifically through the second flow control aperture 98 (FIG. 22) and the second housing aperture 100. Water then flows along flow path S8 through the second hinge outlet conduit 66, the first outer inlet 72 and the first outer passageway 76 of the outer spray portion 20, and ultimately to the second spray outlets 22 (shown elsewhere) for discharge from the showerhead 10. As also shown in FIGS. 18-21, the first flow control member 80 inhibits flow of water from the inner chamber 84 to the third housing aperture 94 and the third hinge outlet conduit 68 (shown elsewhere). As a result, the third spray outlets 24 (shown elsewhere) do not discharge water.

Figure 23:
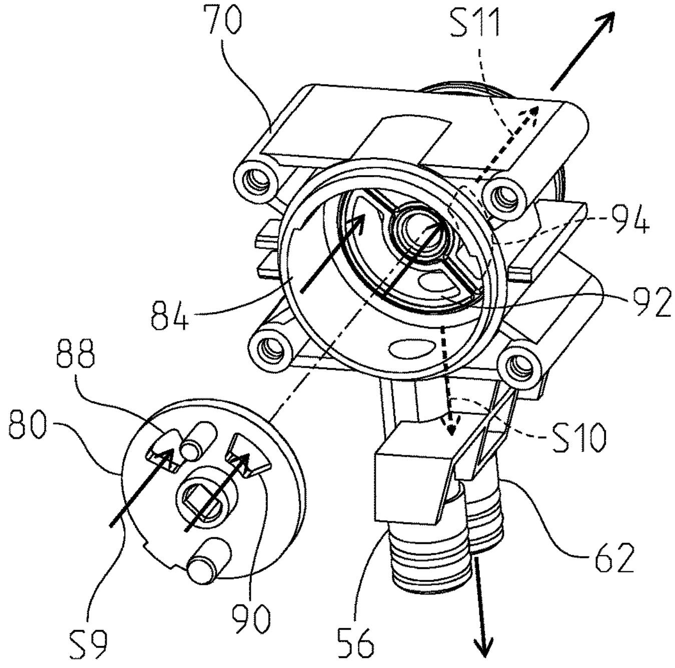
FIG. 23 is an exploded perspective view of the first flow control member and the housing of the hinge in the second spray configuration of the showerhead as illustrated in FIG. 5.
Figure 24:
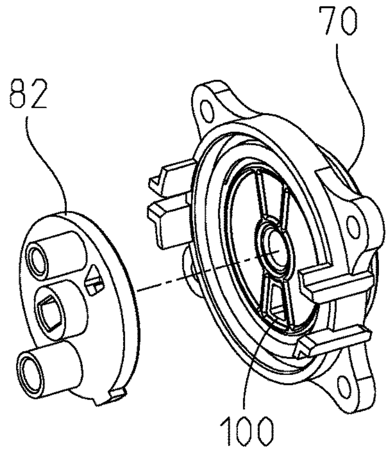
FIG. 24 is an exploded perspective view of the second flow control member and the housing of the hinge in the second spray configuration of the showerhead as illustrated in FIG. 5.

FIGS. 23 and 24 illustrate the first flow control member 80 (FIG. 23), the second flow control member 82 (FIG. 24), and the housing 70 in the second spray configuration of the showerhead 10 (that is, as shown in FIG. 5). In the second spray configuration, water flows from the showerhead inlet 58 (shown elsewhere) to the inner chamber 84 of the housing 70 in the same manner as the first spray configuration (that is, as described above in connection with FIGS. 17-20). As shown in FIG. 23, water flows along flow path S9 through the first flow control member 80, specifically through the first flow control aperture 88, and the first housing aperture 92. Water then flows along flow path S10 through the first hinge outlet conduit 62 and ultimately to the first spray outlets 18 (shown elsewhere) for discharge from the showerhead 10. As also shown in FIG. 23, water flows along flow path S9 through the first flow control member 80, specifically through the third flow control aperture 90, and the third housing aperture 94. Water then flows along flow path S11 through the third hinge outlet conduit 68 (not shown) and ultimately to the third spray outlets 24 (shown elsewhere) for discharge from the showerhead 10. As shown in FIG. 24, the second flow control member 82 inhibits flow of water from the inner chamber 84 through the second housing aperture 100 of the housing 70. As a result, the second spray outlets 22 (shown elsewhere) do not discharge water.

Figure 25:
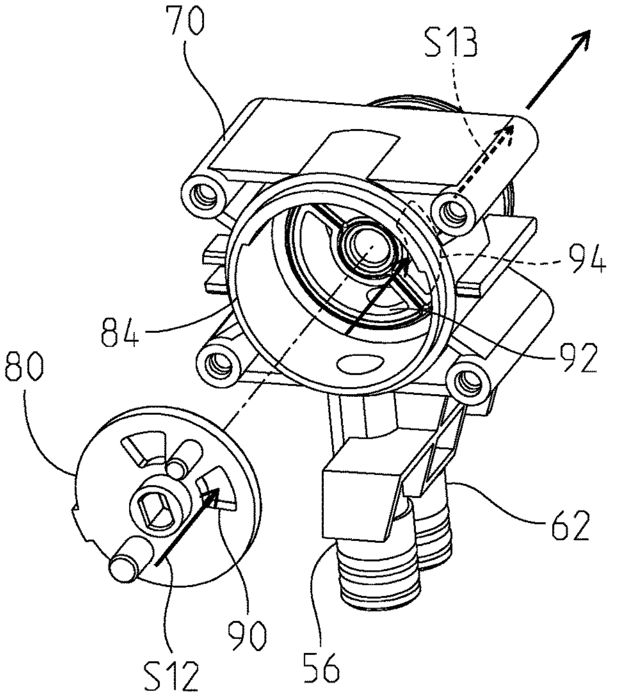
FIG. 25 is an exploded perspective view of the first flow control member and the housing of the hinge in the third spray configuration of the showerhead as illustrated in FIG. 6.
Figure 26:
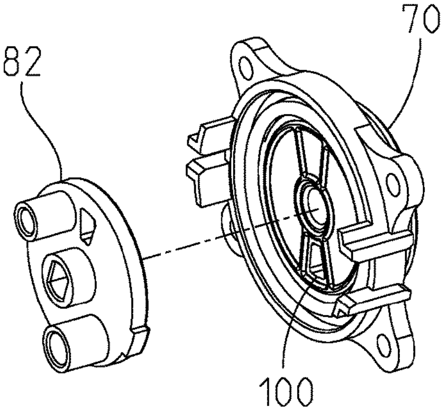
FIG. 26 is an exploded perspective view of the second flow control member and the housing of the hinge in the third spray configuration of the showerhead as illustrated in FIG. 6.

FIGS. 25 and 26 illustrate the first flow control member 80 (FIG. 25), the second flow control member 82 (FIG. 26), and the housing 70 in the third spray configuration of the showerhead 10 (that is, as shown in FIG. 5). In the third spray configuration, water flows from the showerhead inlet 58 (shown elsewhere) to the inner chamber 84 of the housing 70 in the same manner as the first spray configuration (that is, as described above in connection with FIGS. 17-20). As shown in FIG. 25, water flows along flow path S12 through the first flow control member 80, specifically through the third flow control aperture 90, and the third housing aperture 94. Water then flows along flow path S13 through the third hinge outlet conduit 68 (shown elsewhere) and ultimately to the third spray outlets 24 (shown elsewhere) for discharge from the showerhead 10. As also shown in FIG. 25, the first flow control member 80 inhibits flow of water from the inner chamber 84 to the first housing aperture 92 and first hinge outlet conduit 62. As a result, the first spray outlets 18 (shown elsewhere) do not discharge water. As shown in FIG. 26, the second flow control member 82 inhibits flow of water from the inner chamber 84 through the second housing aperture 100 of the housing 70. As a result, the second spray outlets 22 (shown elsewhere) do not discharge water.

Figure 27:
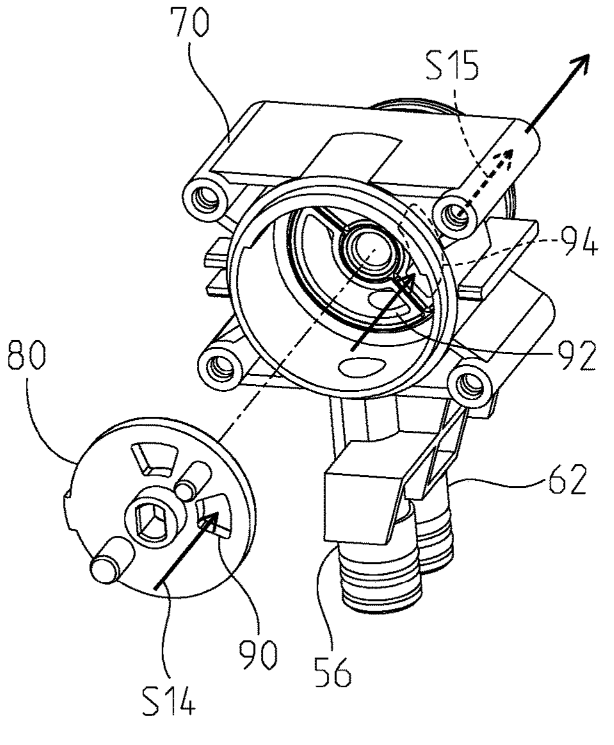
FIG. 27 is an exploded perspective view of the first flow control member and the housing of the hinge in the fourth spray configuration of the showerhead as illustrated in FIG. 7.
Figure 28:
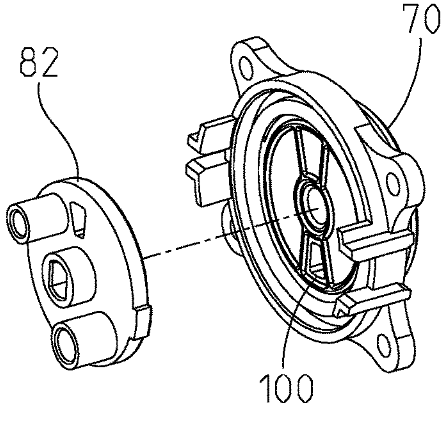
FIG. 28 is an exploded perspective view of the second flow control member and the housing of the hinge in the fourth spray configuration of the showerhead as illustrated in FIG. 7.

FIGS. 27 and 28 illustrate the first flow control member 80 (FIG. 27), the second flow control member 82 (FIG. 27), and the housing 70 in the fourth spray configuration of the showerhead 10 (that is, as shown in FIG. 7). In the fourth spray configuration, water flows from the showerhead inlet 58 (shown elsewhere) to the inner chamber 84 of the housing 70 in the same manner as the first spray configuration (that is, as described above in connection with FIGS. 17-20). As shown in FIG. 27, water flows along flow path S14 through the first flow control member 80, specifically through the third flow control aperture 90, and the third housing aperture 94. Water then flows along flow path S15 through the third hinge outlet conduit 68 (shown elsewhere) and ultimately to the third spray outlets 24 (shown elsewhere) for discharge from the showerhead 10. As also shown in FIG. 27, the first flow control member 80 inhibits flow of water from the inner chamber 84 to the first housing aperture 92 and first hinge outlet conduit 62. As a result, the first spray outlets 18 (shown elsewhere) do not discharge water. As shown in FIG. 28, the second flow control member 82 inhibits flow of water from the inner chamber 84 through the second housing aperture 100 of the housing 70. As a result, the second spray outlets 22 (shown elsewhere) do not discharge water.

Figure 29:
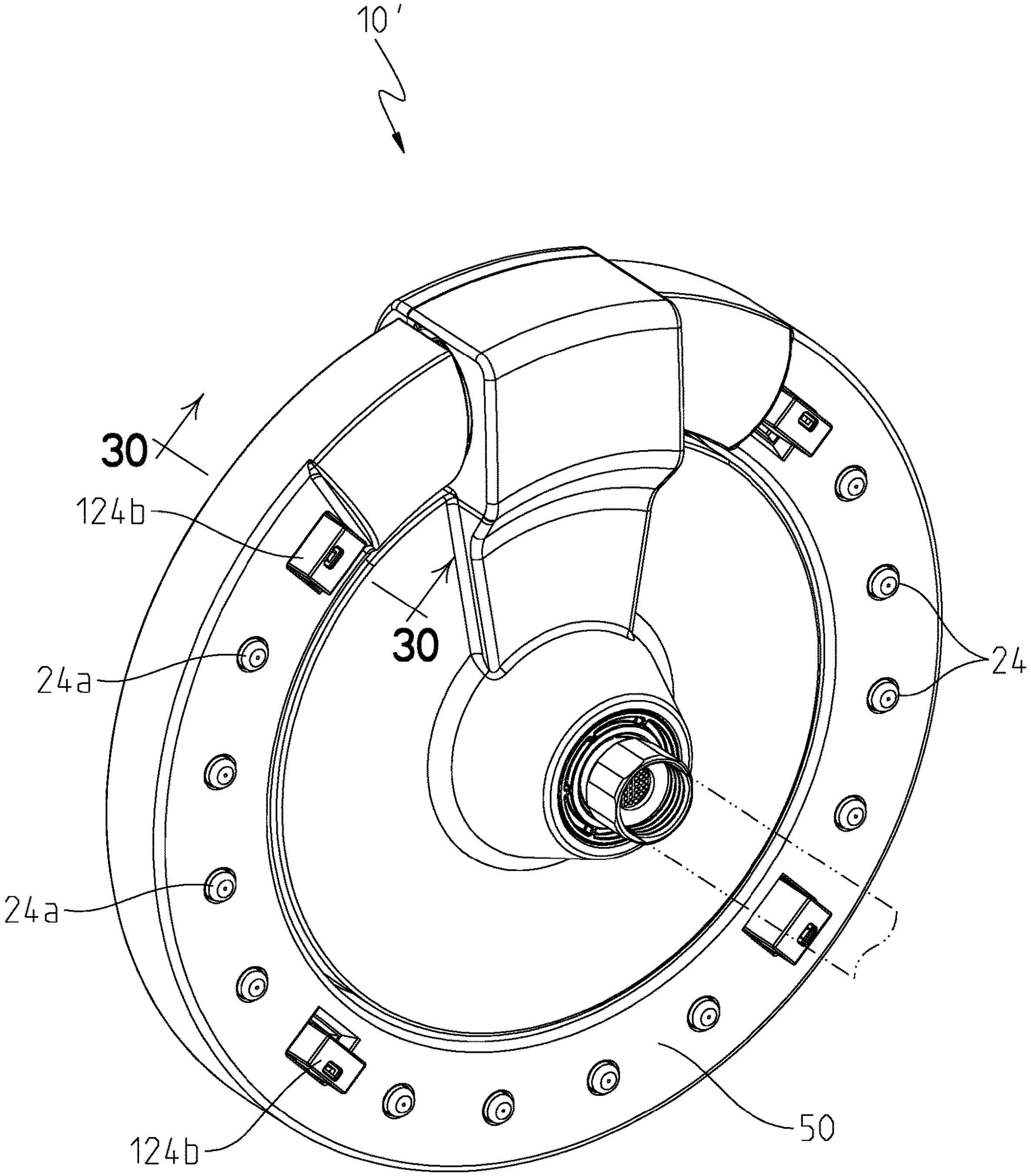
FIG. 29 is a rear perspective view of a further illustrative showerhead of the present disclosure.
Figure 30:
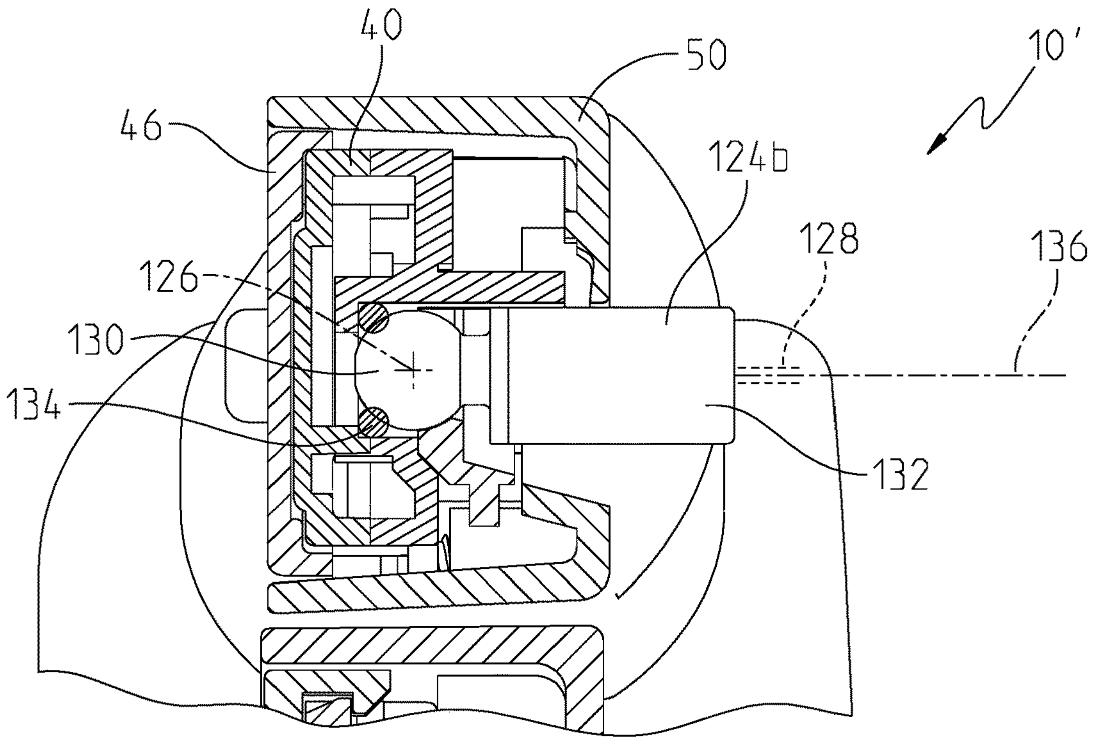
FIG. 30 is a cross-sectional view taken along line 30-30 of FIG. 29, showing the multi-dimensional fluid dispenser in a first orientation.
Figure 31:
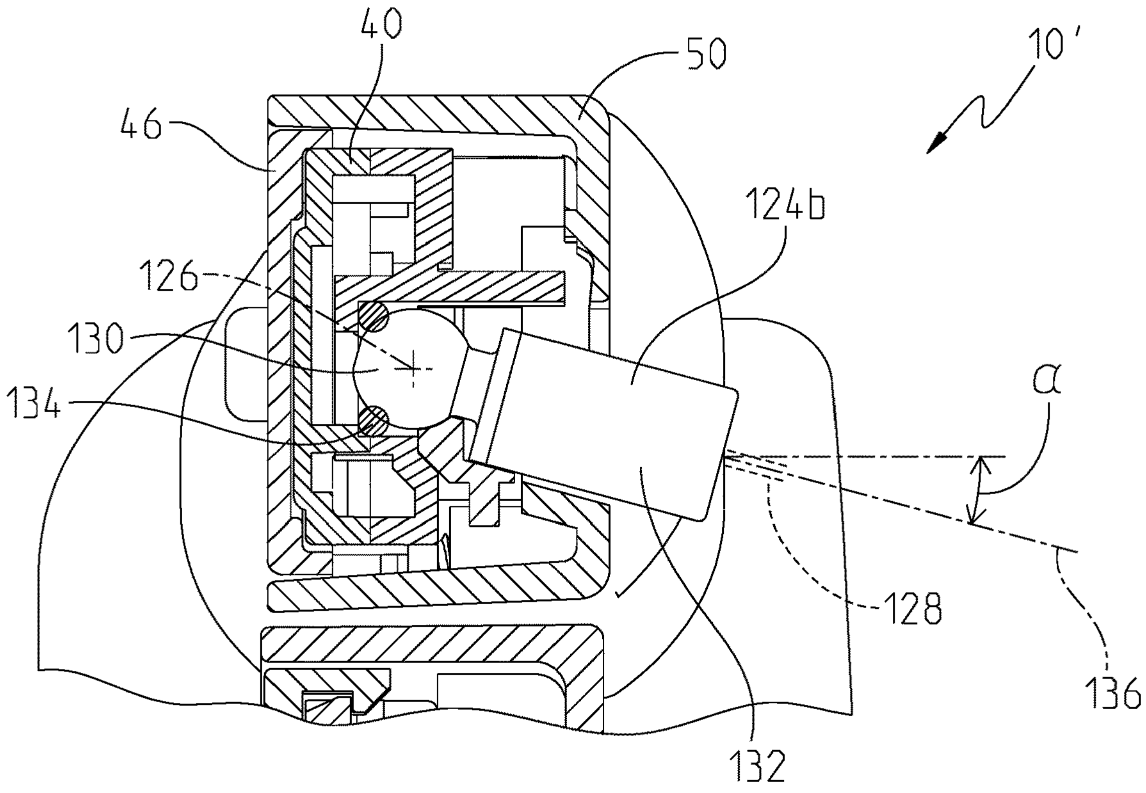
FIG. 31 is a cross-sectional view similar to FIG. 30, showing the multi-dimensional fluid dispenser in a second orientation.

FIGS. 29-31 show a further illustrative embodiment showerhead 10' including many similar components as the showerhead 10 detailed above. In the following description and accompany drawing figures, similar components are identified with like reference numbers.

The illustrative showerhead 10' includes circumferentially spaced spray outlets 24. The spray outlets 24 illustratively include raincan nozzles 24*a* and multi-dimensional fluid dispensers 124*b*. The illustrative multi-dimensional fluid dispensers 124*b* are configured to discharge at least one oscillating water stream 128 similar to the multi-dimensional fluid dispensers 24*b* detailed above. The fluid dispensers 124*b* are illustratively adjustable about a pivot axis 126 to redirect the water stream(s) 128 discharged therefrom.

Each fluid dispenser 124*b* illustratively includes a ball 130 pivotably supported within the base 40, and a housing 132 interfacing with the sprayface 50. An o-ring or gasket 134 cooperates with the ball 130 to provide a seal with the base 40. Illustratively, a longitudinal outlet axis 136 may pivot from a first orientation (FIG. 30) by an angle $\alpha$ to a second orientation (FIG. 31). In an illustrative embodiment, angle $\alpha$ is approximately 15 degrees (+/−5 degrees). In an illustrative embodiment, each fluid dispenser 124 is manually pivotable by a user engaging the housing 132. In alternative embodiments, a user interface, such as a lever, may be actuated by a user to pivot all fluid dispensers 124 simultaneously.

Although the invention has been described in detail with reference to certain preferred embodiments, variations and modifications exist within the spirt and scope of the invention as described and defined in the following claims.

What is claimed is:

1. A showerhead configured to couple to a supply conduit and receive water therefrom, the showerhead comprising:

an inlet configured to receive water from the supply conduit;

an inner spray portion coupled to the inlet;

a first spray outlet coupled to the inner spray portion, the first spray outlet selectively receiving water from the inlet and discharging water from the showerhead in a first discharge direction;

an outer spray portion pivotably coupled to the inner spray portion;

a second spray outlet coupled to the outer spray portion, the second spray outlet selectively receiving water from the inlet and discharging water from the showerhead in a second discharge direction;

a third spray outlet coupled to the outer spray portion, the third spray outlet selectively receiving water from the inlet and discharging water from the showerhead in a third discharge direction, the third discharge direction being substantially opposite the second discharge direction;

wherein the outer spray portion being pivotable relative to the inner spray portion from a first spray configuration to a second spray configuration and vice versa, the first spray outlet receiving water from the inlet and discharging water from the showerhead in the first spray configuration and the second spray configuration, the second spray outlet receiving water from the inlet and discharging water from the showerhead in the first spray configuration, the second spray outlet not receiving water from the inlet in the second spray configuration; and wherein the outer spray portion at least partially extends around the inner spray portion.

2. The showerhead of claim 1, wherein the outer spray portion comprises a front surface and an opposite rear surface, the front surface carrying the second spray outlet and the rear surface carrying the third spray outlet.

3. The showerhead of claim 1, wherein the third spray outlet not receiving water from the inlet in the first spray configuration, and the third spray outlet receiving water from the inlet and discharging water from the showerhead in the second spray configuration.

4. The showerhead of claim 3, wherein the first discharge direction and the second discharge direction are substantially parallel in the first spray configuration, and the first discharge direction and the third discharge direction are substantially opposed in the first spray configuration.

5. The showerhead of claim 3, wherein the first discharge direction and the second discharge direction define an obtuse angle in the second spray configuration, and the first discharge direction and the third discharge direction define an acute angle in the second spray configuration.

6. The showerhead of claim 3, further comprising a flow control member coupled to and pivotable together with the outer spray portion relative to the inner spray portion, the flow control member permitting water to flow from the inlet to the first spray outlet in the first spray configuration and the second spray configuration, and the flow control member inhibiting water from flowing from the inlet to the third spray outlet in the first spray configuration and permitting water to flow from the inlet to the third spray outlet in the second spray configuration.

7. The showerhead of claim 6, wherein the flow control member is a first flow control member, and further comprising a second flow control member coupled to and pivotable together with the outer spray portion and the first flow control member relative to the inner spray portion, the second flow control member permitting water to flow from the inlet to the second spray outlet in the first spray configuration, and the second flow control member inhibiting water from flowing from the inlet to the second spray outlet in the second spray configuration.

8. The showerhead of claim 1, wherein the outer spray portion pivots about a pivot axis relative to the inner spray portion, the pivot axis being substantially perpendicular to the first discharge direction, the second discharge direction, and the third discharge direction.

9. The showerhead of claim 1, wherein the inner spray portion comprises a circular shape, and the outer spray portion comprises a ring shape partially extending around the inner spray portion.

10. A showerhead configured to couple to a supply conduit and receive water therefrom, the showerhead comprising:

an inlet configured to receive water from the supply conduit;

a first spray portion coupled to the inlet;

a second spray portion pivotably carried by the first spray portion, the second spray portion being pivotable relative to the first spray portion from a first spray configuration to a second spray configuration and vice versa, and from the second spray configuration to a third spray configuration and vice versa;

wherein the second spray portion at least partially extends around the first spray portion;

a first spray outlet coupled to the first spray portion, the first spray outlet receiving water from the inlet and discharging water from the showerhead in the first spray configuration and the second spray configuration, and the first spray outlet not receiving water from the inlet in the third spray configuration;

a second spray outlet coupled to the second spray portion, the second spray outlet receiving water from the inlet and discharging water from the showerhead in the first spray configuration, and the second spray outlet not receiving water from the inlet in the second spray configuration and the third spray configuration; and a third spray outlet coupled to the second spray portion, the third spray outlet not receiving water from the inlet in the first spray configuration, and the third spray outlet receiving water from the inlet and discharging water from the showerhead in the second spray configuration and the third spray configuration.

11. The showerhead of claim 10, further comprising a flow control member coupled to and pivotable together with the second spray portion relative to the first spray portion, the flow control member (A) permitting water to flow from the inlet to the first spray outlet in the first spray configuration and the second spray configuration, and inhibiting water from flowing from the inlet to the first spray outlet in the third spray configuration; and (B) inhibiting water from flowing from the inlet to the third spray outlet in the first spray configuration, and permitting water to flow from the inlet to the third spray outlet in the second spray configuration and the third spray configuration.

12. The showerhead of claim 11, wherein the flow control member is a first flow control member, and further comprising a second flow control member coupled to and pivotable together with the second spray portion and the first flow control member relative to the first spray portion, the second flow control member permitting water to flow from the inlet to the second spray outlet in the first spray configuration, and the second flow control member inhibiting water from flowing from the inlet to the second spray outlet in the second spray configuration and the third spray configuration.

13. The showerhead of claim 10, wherein the first spray outlet is configured to discharge water from the showerhead in a first discharge direction, the second spray outlet is configured to discharge water from the showerhead in a second discharge direction, the third spray outlet is configured to discharge water from the showerhead in a third discharge direction, and the second discharge direction and the third discharge direction pivot relative to the first discharge direction as the second spray portion pivots relative to the first spray portion.

14. The showerhead of claim 13, wherein the second spray portion pivots about a pivot axis relative to the first spray portion, the pivot axis being substantially perpendicular to the first discharge direction, the second discharge direction, and the third discharge direction.

15. The showerhead of claim 13, wherein the first spray portion has a circular shape, and the second spray portion has a ring shape partially extending around the first spray portion.

16. The showerhead of claim 15, wherein the second spray portion pivots about a pivot axis relative to the first spray portion, the pivot axis being substantially tangential to the ring shape of the second spray portion.

17. The showerhead of claim 13, wherein the third discharge direction is substantially opposite the second discharge direction.

18. The showerhead of claim 13, wherein the first discharge direction and the second discharge direction are substantially parallel in the first spray configuration.

19. The showerhead of claim 13, wherein the first discharge direction and the third discharge direction define an angle in a range of 35 degrees to 55 degrees in the second configuration.

20. The showerhead of claim 13, wherein the first discharge direction and the third discharge direction define an angle in a range of 5 degrees to 25 degrees in the third configuration.

21. The showerhead of claim 10, wherein at least one of the second spray outlet and the third spray outlet comprises a multi-dimensional fluid dispenser.

22. The showerhead of claim 21, wherein the multi-dimensional fluid dispenser is supported for pivoting movement within the second spray portion.

23. A showerhead configured to couple to a supply conduit and receive water therefrom, the showerhead comprising:

an inlet configured to receive water from the supply conduit;

an inner spray portion coupled to the inlet;

a first spray outlet coupled to the inner spray portion, the first spray outlet selectively receiving water from the inlet and discharging water from the showerhead in a first discharge direction;

an outer spray portion pivotably coupled to the inner spray portion;

a second spray outlet coupled to the outer spray portion, the second spray outlet selectively receiving water from the inlet and discharging water from the showerhead in a second discharge direction;

a third spray outlet coupled to the outer spray portion, the third spray outlet selectively receiving water from the inlet and discharging water from the showerhead in a third discharge direction, the third discharge direction being substantially opposite the second discharge direction; and a flow control member operably coupled to and pivotable together with the outer spray portion relative to the inner spray portion, wherein pivoting movement of the outer spray portion relative to the inner spray portion moves the flow control member to control water flow from the inlet to at least one of the first spray outlet, the second spray outlet and the third spray outlet.

* * * * *